United States Patent
Secher et al.

(10) Patent No.: US 6,220,303 B1
(45) Date of Patent: Apr. 24, 2001

(54) DEVICE FOR LIMITING THE BENDING RADIUS OF A FLEXIBLE DUCT

(75) Inventors: Philippe Secher, Deville les Rouen (FR); John Smyth; Antoine Felix-Henry, both of Ecosse (GB)

(73) Assignee: Coflexip, Paris (FR)

( * ) Notice: Subject to any disclaimer, the term of this patent is extended or adjusted under 35 U.S.C. 154(b) by 0 days.

(21) Appl. No.: 09/180,663

(22) PCT Filed: Feb. 25, 1998

(86) PCT No.: PCT/FR98/00369

§ 371 Date: Nov. 12, 1998

§ 102(e) Date: Nov. 12, 1998

(87) PCT Pub. No.: WO98/41729

PCT Pub. Date: Sep. 24, 1998

(30) Foreign Application Priority Data

Mar. 14, 1997 (FR) .................................................. 97 03095

(51) Int. Cl.⁷ ..................................................... F16L 57/00
(52) U.S. Cl. ............................ 138/110; 138/109; 138/38; 285/41
(58) Field of Search ..................................... 138/109, 110, 138/112, 114, 38; 285/41

(56) References Cited

U.S. PATENT DOCUMENTS

| | | | | |
|---|---|---|---|---|
| 2,463,293 | * | 3/1949 | Mentel | 138/127 |
| 2,487,554 | * | 11/1949 | Hurst | 138/110 |
| 3,062,564 | * | 11/1962 | Stehle | 285/41 |
| 3,831,635 | * | 8/1974 | Burton | 138/114 |
| 4,149,568 | * | 4/1979 | Kuntz et al. | 138/114 |
| 4,367,967 | * | 1/1983 | Albert, Jr. | 138/110 |
| 4,786,536 | * | 11/1988 | Kaempen | 138/109 |
| 4,794,957 | | 1/1989 | Mrtzler | |
| 5,285,744 | * | 2/1994 | Grantham et al. | 138/114 |
| 5,526,846 | * | 6/1996 | Maloberti | 138/109 |
| 5,816,622 | * | 10/1998 | Carter | 138/110 |
| 6,009,907 | * | 1/2000 | Secher | 138/38 |

FOREIGN PATENT DOCUMENTS

| | | |
|---|---|---|
| 0296056 | 12/1988 | (EP) . |
| 0565445 | 10/1993 | (EP) . |
| 2397084 | 2/1979 | (FR) . |
| 2446981 | 8/1980 | (FR) . |
| 2538444 | 6/1984 | (FR) . |
| 2291686 | 1/1996 | (GB) . |
| 92/12376 | 7/1992 | (WO) . |
| 94/09245 | 4/1994 | (WO) . |

* cited by examiner

Primary Examiner—James Hook
(74) Attorney, Agent, or Firm—Ostrolenk, Faber, Gerb & Soffen, LLP

(57) ABSTRACT

The invention concerns a device for limiting the bending radius of a flexible duct comprising at least a bend stiffener arranged around one length of the flexible duct and fixed by a rear part on a fixed end support, characterized in that it further comprises an element for maintaining the bend stiffener arranged between the flexible duct and the bend stiffener and comprising at least a portion capable of flexural bending extending over one length of the flexible duct located at least between the rear part and the end of the bend stiffener.

41 Claims, 12 Drawing Sheets

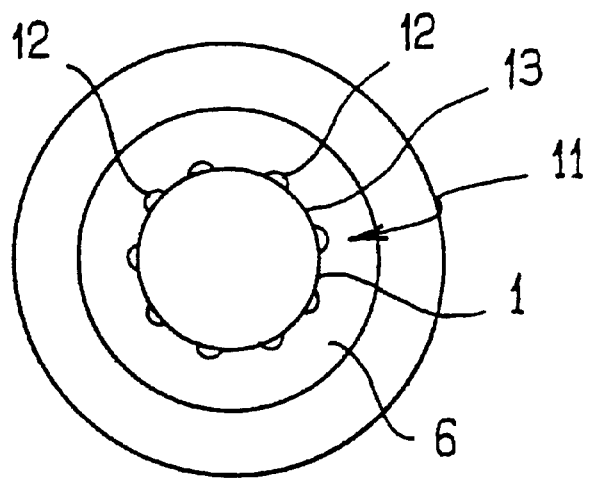
FIG_2
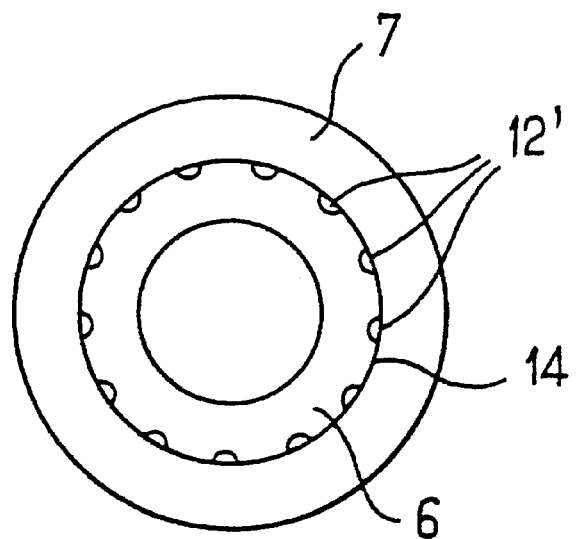
FIG_3

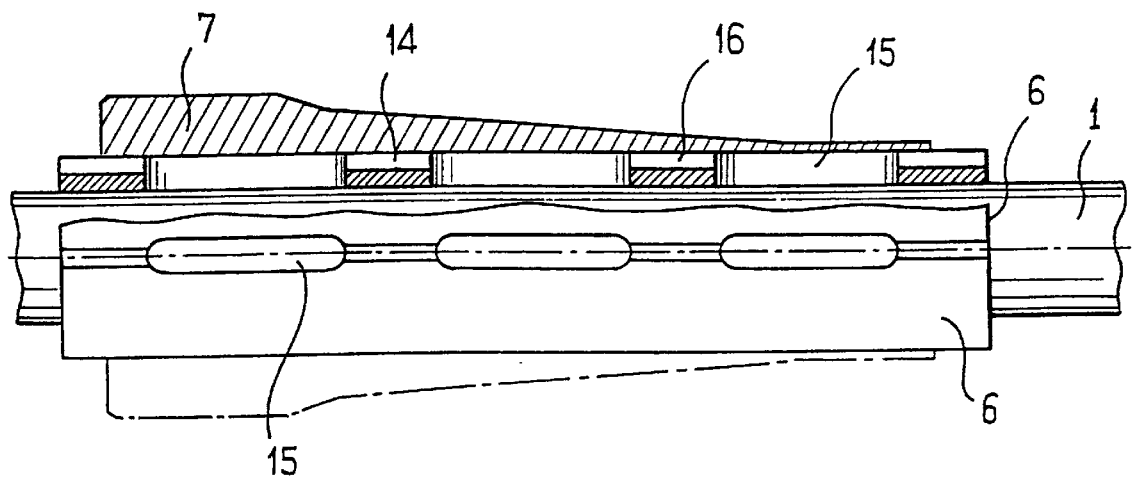
FIG_4
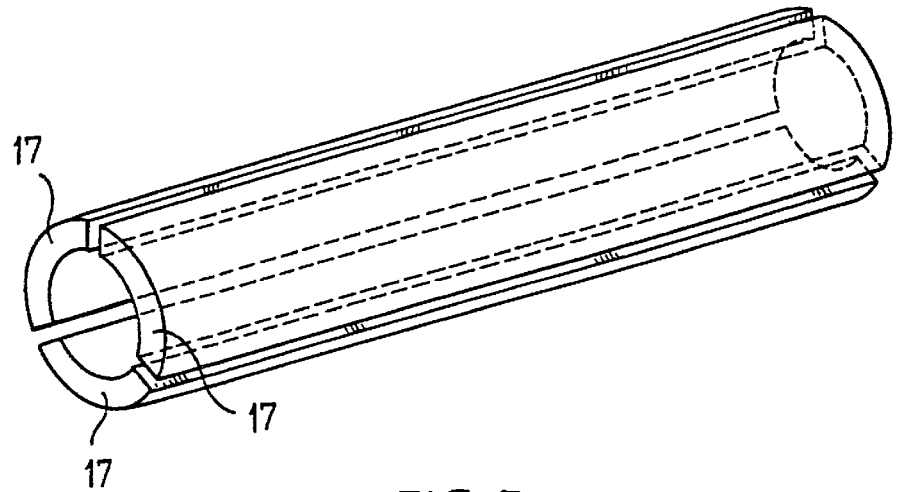
FIG_5

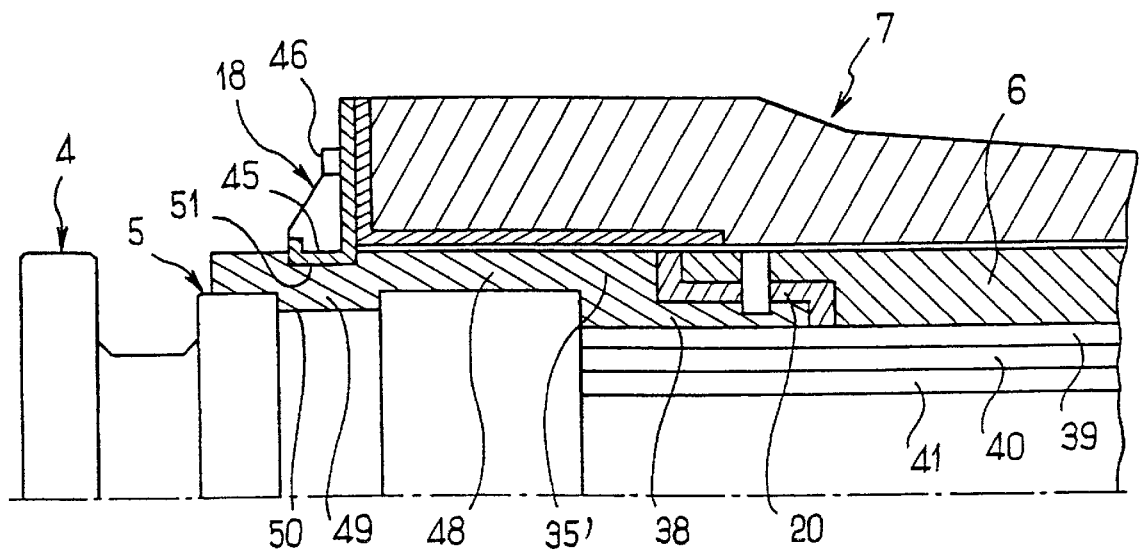
FIG_8
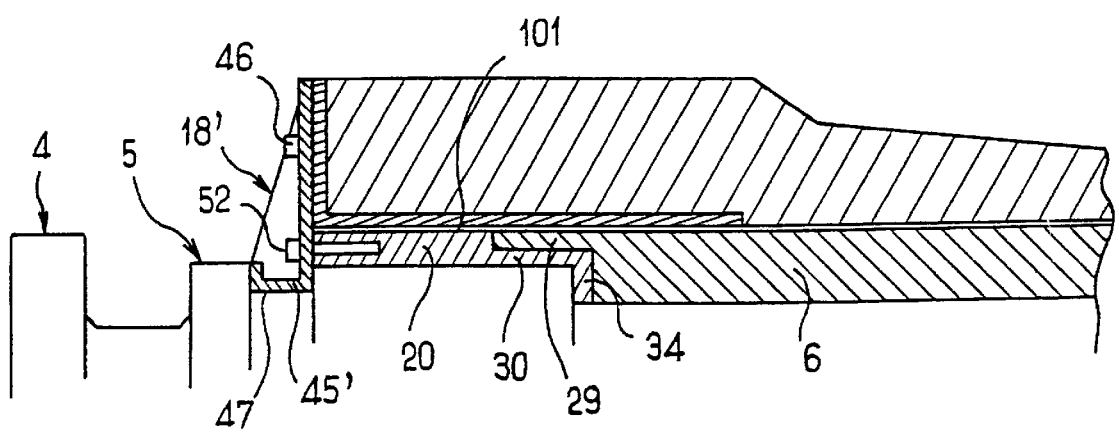
FIG_9

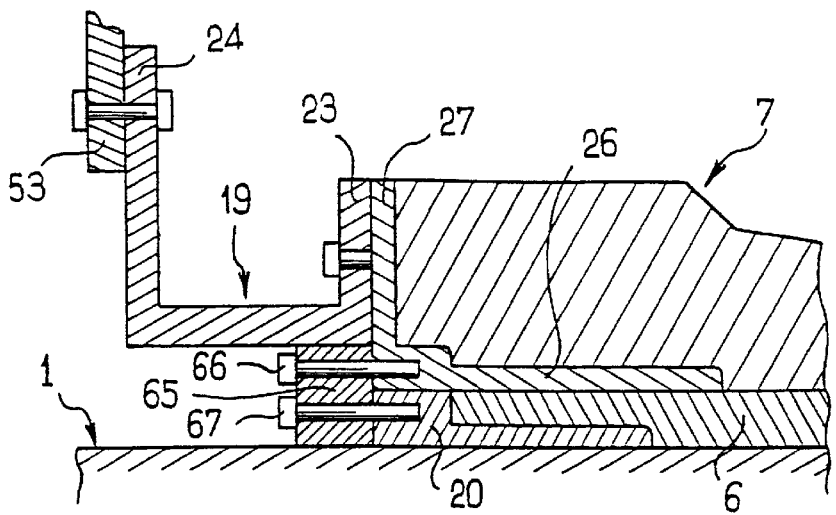
FIG_13
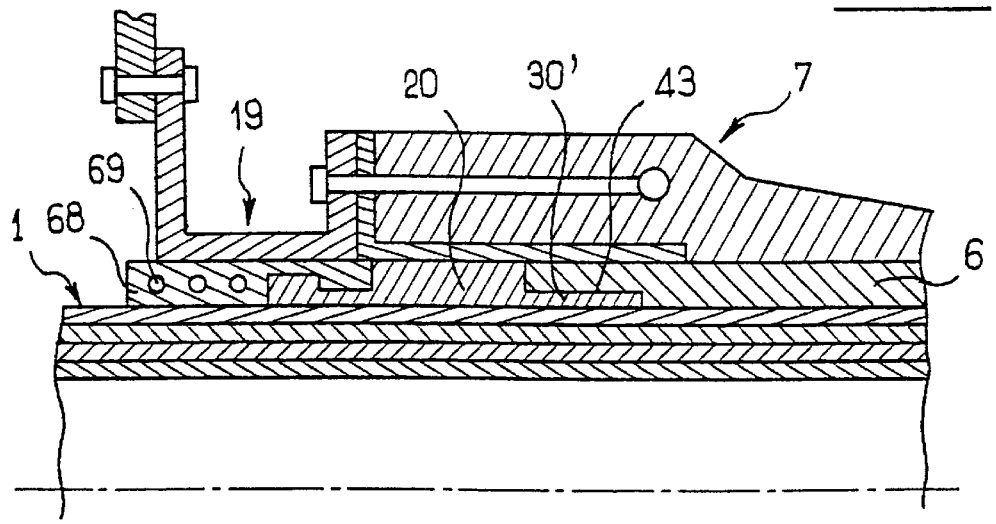
FIG_14
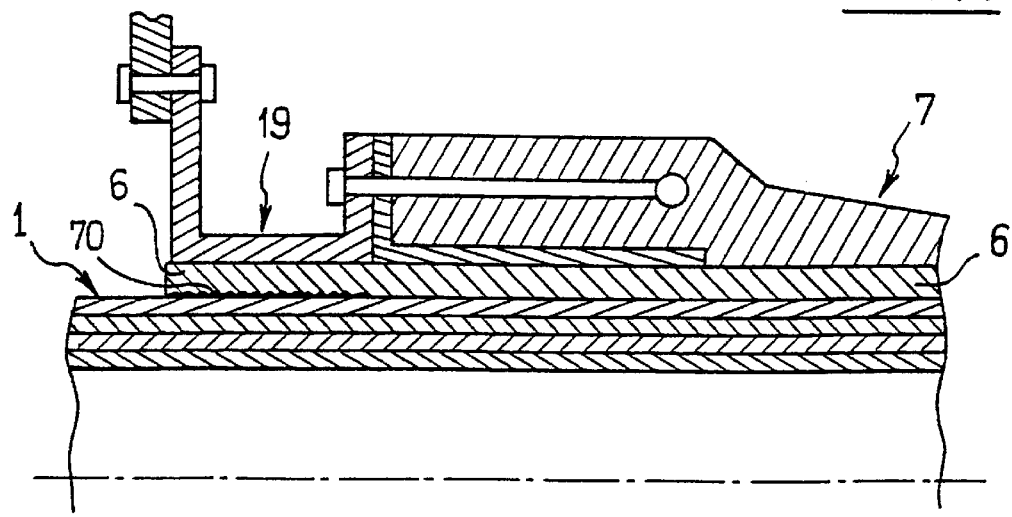
FIG_15

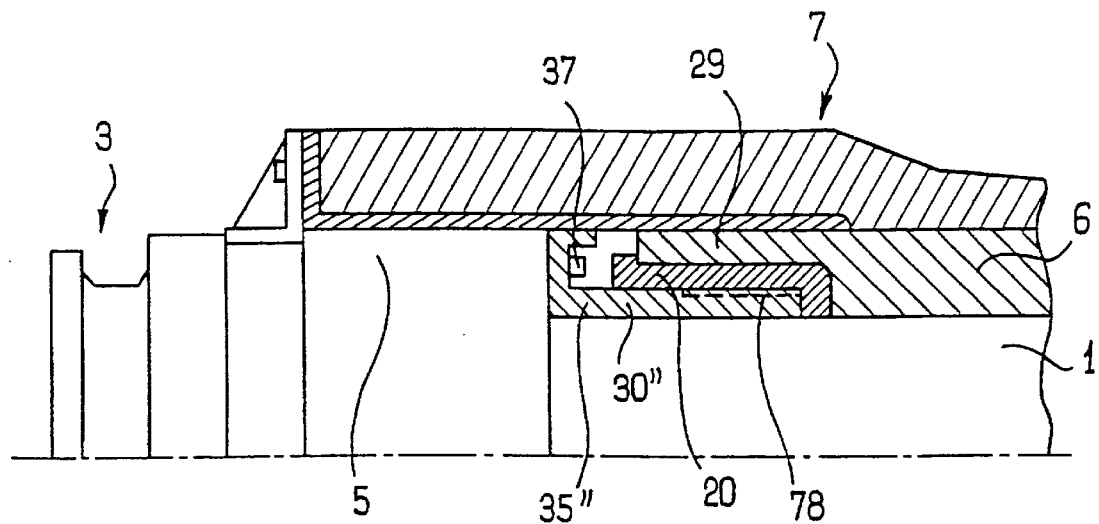
FIG_19
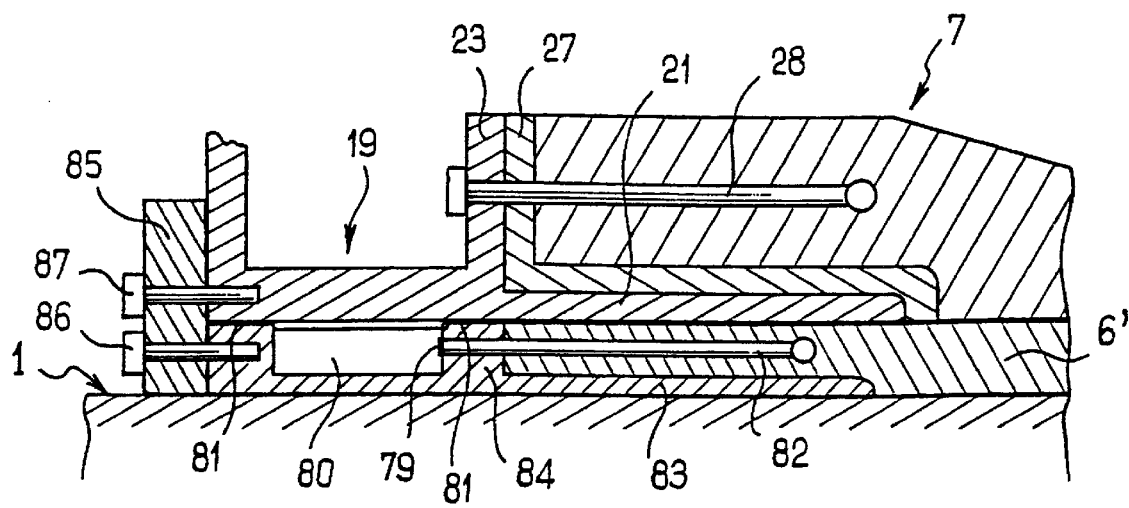
FIG_20

DEVICE FOR LIMITING THE BENDING RADIUS OF A FLEXIBLE DUCT

BACKGROUND OF THE INVENTION

The present invention relates to a device for limiting the bend of a flexible pipe, particularly in cases where the pipe has a fitting of a diameter larger than that of the pipe, and more specifically a device comprising a stiffener intended to be fitted to a flexible pipe through which there flows a hot fluid, the temperature of which exceeds 80° C.

Such flexible pipes, the structure of which is well known, are used especially in the oil industry for raising or transporting hydrocarbons from a subsea well head to a platform or floating equipment such as a Floating Production and Storage Offloading boat known by the abbreviation FPSO. These flexible pipes are described in the document "Recommended Practice for Flexible Pipe—API Recommended Practice 17 B" published by the American Petroleum Institute.

The bend limiter according to the invention can also be used with other types of flexible pipelines, particularly in the case of subsea oil extraction installations, such as multi-pipe flexible lines known as umbilicals or electrical cables.

When the flexible pipe is working statically, as is the case when it is resting on the seabed, it is not very subject to bending. On the other hand, when it is working dynamically, as is the case when it is used as a riser, it is then subject to reverse deformations and especially bending which may lead to substantial bending of the said flexible pipe. Now, it is necessary for the Minimum Bend Radius (MBR) not to be smaller than a certain value (a reminder of this is given in the document API RP 17 B cited above). In order to limit the bend radius to an acceptable value, use is made of stiffeners which reduce the bending of the pipe at the critical points (stiffeners described in API RP 17 B by the name of "bend stiffener"). For example, a stiffener is fitted in the region where the flexible pipe is joined to the end fitting or fittings which are fitted to the flexible pipe at its two ends, an end fitting comprising, as described in API RP 17 B by the name of "end fitting", on the one hand, a flexible pipe termination member ("end termination"), and on the other hand, a member ("end connector") for connection to the corresponding pipelines to which the flexible pipe is connected, particularly a subsea well head and/or a support on the surface, such as a ship or a platform.

A stiffener may also be mounted on the running length of the flexible pipe, some distance from the end fittings, for example at the edge of an intermediate support ("pipe tray") in the case of a flexible pipe being used as a riser with a "lazy S" or "Steep S" configuration, as described in API RP 17 B, or alternatively, at the end of a rigid guide tube protecting the upper part of the flexible pipe, as depicted in FIGS. 11, 12 and 13 of WO 92/12376 or in EP-565,445 (Coflexip's build-in stiffener).

Such stiffeners are well known. They may consist of a single elastic body moulded in polyurethane and may alternatively comprise an internal reinforcing structure as described in WO 92/12376 or in GB-A-2,291,686. They may also comprise heat-dissipation means, as is recommended in FR-95 14114—not published—in the name of the Applicant, and GB-A-2,291,686. The heat-dissipation means are intended to dissipate some of the heat at the interface between the elastic body of the stiffener and the flexible pipe, the heat coming from the fluid flowing through the said flexible pipe. This is needed because it has been discovered that the heat damages the plastic (polyurethane) of the stiffener by hydrolysis in contact with the sea water, hydrolysis leading to a loss of mechanical properties of the stiffener, and especially to a loss of stiffness.

In all cases in which a stiffener is used, the stiffener is normally arranged on the flexible pipe before the end fittings are fitted and attached, radial clearance between the flexible pipe allowing the end fitting to be slid along the flexible pipe. Once the end fittings have been fitted to the flexible pipe, the stiffener is brought, by sliding, onto the corresponding end fitting and attached thereto by appropriate means which are at least partially described in the prior-art documents. Alternatively, if the stiffener is to be installed along the running length of the pipe, it is positioned at the desired point by temporary or permanent attachment means, such as a collar tightened around the pipe.

This being the case, it is the entire assembly consisting of the flexible pipe, the end fittings and the stiffener, which is transported to the place of use; this assembly is usually wound onto a reel or arranged in a basket for transport purposes. The winding onto a reel and subsequent transport pose serious problems which hitherto have not been adequately solved. A problem is that independently of the weight of the flexible pipe and of the end fittings, it is important to note that each stiffener may have a length which may be of the order of four meters long and combined with the end fitting constitute a localized load that can be as much as about three tons. This results in problems of bulk, of balance and of handling which seriously affect all of the implementation operations from the end of manufacture of the pipe and its loading onto a ship, as far as installing it at the off-shore site. In particular, getting the stiffener to pass through the various pipe-handling members, such as tracked tensioners, or curved supports or the grooves of pulleys, requires tricky and lengthy manipulation.

In practice, the size of the stiffeners is currently limited by these problems of handling which are caused by the fact that they are fitted to the flexible pipe. Now, the continuing increase in the diameter and the weight is of the flexible pipes and in the depth of water means that there is now a need for even heavier stiffeners, and ones whose length would exceed five meters, something which is practically unachievable on account of the handling difficulties.

In order to overcome these difficulties, it would be natural to envisage fitting the stiffeners in situ at the time the flexible pipe is installed on board the laying ship. An installation for overmoulding around the pipe is obviously excluded, because of the length of time needed for the operation and because of the surrounding conditions. From another source, stiffeners are known which are made in two halves which can be fitted at the last minute and joined together around the flexible pipe by means such as bolt-on collars, as described in FR-2,446,981, but experience has shown that a stiffener of this kind is unable to exhibit the required mechanical characteristics, irrespective of the direction of bending of the pipe.

SUMMARY OF THE INVENTION

The object of the present invention is to overcome the aforementioned drawbacks and to propose a simple and effective solution without increasing the cost of manufacturing the assembly mentioned above.

The subject of the present invention is a bend limiter for a flexible pipe fitted with end fittings arranged at the two ends of the flexible pipe, and comprising at least one stiffener which is arranged around a length of the flexible pipe and which is fixed by a rear part to a build-in support, characterized in that it further comprises a bearing element for the stiffener, which is arranged between the flexible pipe and the stiffener and which comprises at least one part which is deformable in bending and extends over a length of the flexible pipe lying at least between the rear part and the front end of the stiffener.

An important advantage of the present invention lies in the fact that the stiffener or stiffeners and the flexible pipe fitted with its two factory-fitted end fittings can be transported independently of one another, the stiffener or stiffeners then being fitted at the installation site without requiring means other than those usually available for putting the flexible pipe installation in place from the laying ship in the same way as various pipe accessories such as buoys are put in place.

In effect, by producing a stiffener, the inside diameter of the central through-passage of which is at least equal to the maximum diameter of the end fitting, give or take tolerances, it is possible to bring the stiffener over the outside of the flexible pipe and place it around the end fitting, then to slide it around or inside the fitting to get it into the right position on the flexible pipe around the support element.

The maximum diameter of the end fitting is understood to mean the external dimensions exhibited by the largest-sized non-detachable part of the end fitting around which the stiffener needs to pass. When the end fitting comprises or is permanently attached to a connecting flange (end connector) with transverse dimensions that exceed those of the central body of the fitting (end termination), it is the dimensions of the flange which constitute the maximum diameter, because in such cases, the stiffener needs to be able to be slid over the connecting flange. It goes without saying that when the end fitting has no connecting flange or if it has been separated from the flange, then it is the external dimensions of the central fitting body which define the maximum diameter.

Likewise, when the stiffener is fitted on the running length of the pipe and attached to an intermediate attachment member remote from an end fitting, and if the diameter of the intermediate member exceeds that of the end fitting and/or the associated elements, then the maximum diameter will be that of the intermediate member. In fact, the maximum diameter to be taken into consideration is the diameter of the largest member over which the stiffener has to be slid.

In all that follows, reference is made to the idea of diameter for reasons of simplicity and of clarity, it being assumed that the elements involved are cylindrical with symmetry of revolution. However, it goes without saying that the elements may not have symmetry of revolution and that the inside and/or outside diameters involved could be the internal and/or external transverse dimensions of the elements.

Another advantage is that the problems of bulk, imbalance and handling during transport between the manufacturing factory and the production site, or at least those directly associated with the stiffener(s) are almost completely eliminated because the stiffener or stiffeners are no longer factory-fitted to the flexible pipe.

Another advantage of the present invention is that the support and bearing element may constitute a wearing piece that can be changed without difficulty when wearing occurs, for example by hydrolysis, without requiring the actual stiffener to be replaced, replacing the support element being particularly easy when this element consists of several parts or sectors. What is more, the support and bearing element may be fitted to the flexible pipe at the factory or on the production site when it is made of several parts.

Another advantage is that it becomes possible, in the event of wear or damage to a stiffener, for this to be replaced at the installation site without it being necessary to remove the end fitting accessible from the support, such as a platform or a ship, to which the end of the flexible pipe is attached. This advantage is a particular benefit because the replacement fitting, and fitting it, are very expensive and because any intervention of this kind offshore considerably increases the normal costs because of the logistic support needed and the production stoppages and also because changing a fitting demands a reduction in the length of the flexible pipe, which may pose problems.

When there is a desire to dissipate the heat given off by the fluid flowing along the flexible pipe, it is possible to use the means of the prior art, with the additional advantage, conferred by the present invention, of it being possible to provide these not in the stiffener, as this is often difficult on account of the mass of the stiffener, but in the support and bearing element which is very simple to manufacture. The heat-dissipation means, whether they use conduction, with metal inserts acting as radiators, or convection using channels, adapt themselves very readily to the support and bearing element. What is more, when use is made of sea water circulation grooves, these can be formed either on the interior surface of the support and bearing element, so as to cool the exterior skin of the flexible pipe by direct contact, or on the exterior surface of the support and bearing element in order simultaneously to cool the interior surface of the stiffener and the exterior skin of the flexible pipe, by a sensible choice of the material used to manufacture the support and bearing element. There is no reason, however, why such sea water circulation grooves cannot be arranged on the interior surface of the stiffener.

The stiffener has an active front part which accompanies the flexible pipe in its deformations in bending while at the same time limiting the amplitude of this bending, the support element comprises at least one front part against which the active part of the stiffener bears along its entire length, and the front end of which is at least level with the front end of the stiffener and preferably beyond this end. As the front end part of the active part of the stiffener is commonly of frustoconical overall shape, the front part of the support element can thus have an end part which extends the stiffener and the exterior surface of which can be either cylindrical or frustoconical in extension of the exterior outline of the stiffener.

As is known, the stiffener comprises a rear build-in part, which is generally cylindrical in shape, and by means of which the stiffener is attached into a build-in support in such a way to withstand the bending moments and lateral loadings caused by movements of the flexible pipe and, possibly, axial loadings. The build-in support may be a rigid member secured to the flexible pipe, typically such as a fitting or collar tightened around the flexible pipe. In this case, the stiffener is normally built in around the build-in support or around a build-in member secured thereto. Alternatively, the build-in support may be a rigid member independent of the flexible pipe and arranged around it, such as the end part of a rigid tube. In the latter case, the stiffener is normally built into the build-in support. Typically, a radial clearance between the support element and the internal axial passage of the stiffener or the exterior surface of the flexible pipe then allows the latter to slide freely with respect to the stiffener and to the build-in support.

In these various embodiments, the support element preferably comprises a rear attachment part used to immobilize it in the axial direction of the flexible pipe. The support element may be attached axially by bonding to the exterior surface of the flexible pipe.

As a preference, use is made of an attachment support that has an annular overall shape, or comprises several elements joined together around the pipe in the fashion of circular segments and which have an annular overall shape corresponding to the configuration of the support element. The support for attaching the bearing element may be arranged inside the latter, and be secured to the flexible pipe, particularly in the form of a metal or plastic collar tightened around the pipe, or of a cylindrical bearing surface on the exterior surface of the fitting. When, in particular, the build-in support of the stiffener is independent of and outside the flexible pipe, the support for attaching the bearing element may also comprise an element that forms an integral part of or a member secured to the stiffener or the build-in support.

The bearing element may be joined, in its rear part, to the attachment support by any known means of attachment, for example simply by bonding. Advantageously, the attachment support can be blocked in the axial direction of the pipe by attachment accessories such as radial pins which connect to the build-in support or to an intermediate member. As a preference, the attachment support comprises a cylindrical bearing surface capable of being made to bear on a corresponding cylindrical bearing surface of the rear part of the bearing element. In particular, use may be made of radial clamping means which can be secured to the attachment support or to the bearing element and which are operated in such a way as to cancel out the radial clearance between the said cylindrical bearing surfaces and, possibly, as to exert a radial clamping force between these surfaces.

When the stiffener is built onto a fitting, its rear build-in part may advantageously be arranged around a cylindrical bearing surface at the surface of the fitting, if this bearing surface has a diameter that exceeds that of the connecting member, such as a flange, provided for connecting the pipe at its end. The bearing element is then attached axially to the fitting via an annular attachment support arranged between the exterior surface of the flexible pipe and the stiffener. Alternatively, when the connecting member has a diameter that exceeds that of the body of the fitting which includes the pipe termination member, the rear build-in part of the stiffener may be arranged around the body of the fitting and separated therefrom by an annular member which may be the attachment support used to block the bearing element with respect to the fitting. As the axial central passage of the stiffener has an approximately cylindrical surface, the stiffener therefore bears, at its rear build-in part, on the attachment support, while the rest of the stiffener bears on the bearing element.

In another embodiment, particularly when the stiffener is fitted on a build-in support arranged on the outside of the pipe, the bearing element may be attached to the build-in support either directly or by means of an attachment support, it being possible for the build-in support for this purpose to comprise an attachment bearing surface which may be cylindrical, or conical, or alternatively in a plane perpendicular to the axis of the pipe. In the case of fittings of this kind, the bearing element attached to the build-in support of the stiffener may have radial clearance with respect to the flexible pipe, and this will allow the latter to slide freely in the central passage of the stiffener.

The bearing element may consist of a single-piece cylindrical annular member which may have been manufactured separately then mounted around the flexible pipe before the end fittings were fitted. A one-piece bearing element of this kind may also be produced by winding a strip or by overmoulding around the pipe, so that it is then possible to fit the bearing element after the fittings have been fitted to a flexible pipeline which is already completed and tested, or alternatively may make it possible for a bearing element to be replaced, if necessary, on the site at which the flexible pipe is being used, without it being necessary to replace the accessible end fitting.

According to another particularly advantageous embodiment, the bearing element comprises a number of blocks or sectors which can be joined together, the assembly thus produced having an overall shape which is approximately cylindrically annular. The lateral edges of the blocks which constitute their assembly surfaces may typically form radial planes passing through the axis of the flexible pipe, or may alternatively still, form helical surfaces. Advantageously, there is a slight gap between the lateral edges of the blocks. The circumferential clearance thus obtained has a value which is chosen to suit the diameter of the flexible pipe, which diameter may vary typically between about 30 to 50 mm and about 500 mm. The total circumferential clearance obtained by adding up the elemental clearances corresponding to each space between blocks may thus vary between about 5 mm for small flexible pipes and 30 to 60 mm for larger ones.

Advantageously, the bearing element, before it is permanently fitted, has a radial clearance with respect to the flexible pipe and with respect to the build-in support of the stiffener. The bearing element can be blocked in its final position thanks to the attachment support by pressing the rear attachment part of the bearing element against the flexible pipe and/or against the build-in support in such a way as to cancel out the radial clearance, while preferably keeping some radial clearance at the front part of the support element. The radial clearance, defined by the difference in radii of the two cylindrical surfaces which face each other may be a few tenths of a mm for small pipes, and may be as much as 5 to 10 mm for larger ones.

When the bearing element is blocked in position by an attachment support, the latter may constitute a one-piece annular member and be fitted, just like the bearing element, before the fittings are fitted. According to an advantageous embodiment, the attachment support may be made in at least two parts which may be brought up separately and joined together around the pipe like a collar so that, on the one hand, the bearing element can be attached to the attachment support, and on the other hand, the latter can be blocked on a fitting and/or on a build-in support of the stiffener outside the pipe or a member secured to the build-in support and/or to the flexible pipe. The invention also relates to a method for fitting the support element and the stiffener which, for example, includes the following steps:

completing the manufacture of the flexible pipe, fitting the previously-manufactured bearing element around the pipe, fitting the fittings, pressure-testing before loading the wound pipe onto a reel or into a basket, loading the stiffener and the attachment support on board the laying ship used for transporting the flexible pipe to the off-shore site and laying it, fitting the stiffener around the flexible pipe, by making an end fitting which may be either the end fitting at the first end which corresponds to the start of the pipe unwound from the storage means, or the end fitting of the second end pass through the stiffener, fitting the support for attaching the bearing element, positioning the flexible pipe inside the build-in support of the stiffener when the latter is of the type on the outside of the pipe, attaching the bearing element to its attachment support, blocking the attachment support on the fitting and/or on the flexible pipe and/or on the build-in support, and blocking the stiffener on its exterior build-in support or on the fitting, it being possible for the order in which these three operations are carried out to vary depending on the characteristics of the installation and the procedure used for laying the flexible pipe.

It will be easy to appreciate all the alternative forms of the installation procedure that the invention allows, for example, the fitting, at the last minute, on board the laying ship, of a bearing element made in two or three sections; or fitting the attachment support around the flexible pipe at the end of manufacture at the factory before the fittings are fitted.

Although on account of its bulk and its weight the fitting of the stiffener around the flexible pipe and the handling of the resulting assembly constitute a problematical operation, the invention allows these to be carried out easily on board the laying ship or from the floating support, such as a platform or a ship of the FPSO type, from which the flexible pipe being used as a riser is suspended. In the most conventional way, the flexible pipe is laid by unrolling it horizontally above the deck of the laying ship either from a storage basket, tension being provided by one or more multi-tracked linear tensioners, or from a winch which combines the two functions of storage and of pulling, and the pipe is then wound for about 90° around a deflector member (overboarding device) such as a curved support or wheel until it drops over the outside of the hull towards the seabed. The stiffener can then be installed either on the vertical part of the flexible pipe just below the deflector member, or on the horizontal part of the pipe between the tensioners and the deflector member. In the latter case, the operation can be made easier by using one of many known means that allow an accessory such as a stiffener to pass around the deflector member even though this accessory is relatively rigid and of large diameter over a substantial length. It is possible, for example, to use a maneuvering table turning about a horizontal axle while remaining tangential to the circular profile of the deflector member. The stiffener is installed on the maneuvering table initially horizontally so that the first-end end fitting can be passed through the stiffener, or alternatively, by winding it back using a hauling cable, so as to allow the second-end end fitting to pass through the stiffener, then the maneuvering table is tilted in order to lower the stiffener until it gets past the deflector member.

According to a particularly advantageous embodiment, the flexible pipe is laid from a device known by the name of a VLS (Vertical Lay System) described in Patent EP 478, 742. The stiffener may be brought into the derrick from the deck of the ship to be arranged vertically underneath the main tensioning means which consist, for example of a four-track system supported by the derrick and along the axis of these, it being possible for the tracks to be parted laterally to allow the upper part of the stiffener to pass. It is thus possible either to lower through the stiffener the first-end fitting and the flexible pipe descending from the top of the derrick, or, at the end of the laying of the pipe section in question, to raise vertically, using a hauling cable, the second-end fitting in order to make it pass upwards through the stiffener together with the flexible pipe. Alternatively, it is possible, with the stiffener still lying on the deck, to make the end fitting and the end part of the flexible pipe pass through its central passage, the flexible pipe having been deviated from its vertical direction along the axis of the derrick into a horizontal direction.

Typically, the bearing element mainly comprises a cylindrical annular part in the form of a sleeve, made of a single piece or of several sectors joined together around the flexible pipe. When the flexible pipe, subjected to a high axial loading, is curved, adopting a curvature which is limited as a function of the rigidity of the stiffener to bending, the radial clearances between the bearing element and the flexible pipe and/or the stiffener are canceled out on the inner, concave side of the flexible pipe, that can be called the inside of the curve, the wall of the bearing element being subjected to a somewhat substantial radial compression effect in this inside of bend region between the stiffener and the flexible pipe. The main property that the material of which the wall of the bearing element is made needs to exhibit is the ability to withstand this compression effect, the deformation under maximum load having to remain compatible with the operation of the stiffener, that is to say below about 5 to 10% in practice. The bearing element must, on the other hand, have enough flexibility to accompany the flexible pipe in its curving, and thus in the case of dynamic applications be able to withstand a great many tension-compression reverse cycles corresponding to the various regions of the support element alternately adopting positions on the outside and on the inside of the curve.

The bearing element may comprise a member in the form of a sleeve made of plastic. This material may be homogeneous, particularly a thermoplastic or an elastomer, or cellular, or may alternatively be of the composite type containing fillers such as short or continuous fibers, or nodular fillers such as microspheres. Depending on the rigidity of the materials used, the bearing element may, in addition to its main mechanical function which is that of transmitting the radial loadings between the flexible pipe and the stiffener, have a flexural rigidity which combines with that of the stiffener and may reach as much as ¼ or ⅓ of the rigidity of the stiffener.

The bearing element may also comprise several rigid rings, for example made of metal, spaced along the length of the bearing element and embedded in a plastic matrix.

In one specific embodiment, the bearing element may comprise several articulated annular pieces, it being possible for each piece to move angularly with respect to the two pieces on either side of it in order to follow the curvature of the flexible pipe, until they come against each other, limiting the curvature. A bearing element of this kind works in the same way as the bend limiters (as defined in API R.P. 17 B) commonly made of elements like vertebrae. The articulated annular pieces may have crosssections in the shape of a U interlinking top to toe or in the shape of a Z with two circular bearing surfaces of different diameters, or alternatively have bearing surfaces that form ball joints.

Other features and advantages will become clearer from reading the description of several embodiments of the invention, and from the appended drawings in which:

DESCRIPTION OF THE DRAWINGS

FIGS. 2 and 3 are views in cross-section on II—II of FIG. 1, according to two embodiments of the heat-dissipation means, FIG. 4 is a view of a support and bearing element with other heat-dissipation means, FIG. 5 is a diagrammatic section through a support and bearing element made in several parts, FIGS. 7 to 21 are diagrammatic sectional views of the connecting means and of the build-in means of the stiffener and provided in the device according to the invention.

DESCRIPTION OF THE PREFERRED EMBODIMENTS

In the description which follows, mention is made of a flexible pipe fitted with an end fitting, but it is understood that the present invention applies to flexible pipes with two end fittings. Likewise, the present invention can be implemented at any point along the flexible pipe where it is necessary to limit the curvature.

Figure 1:
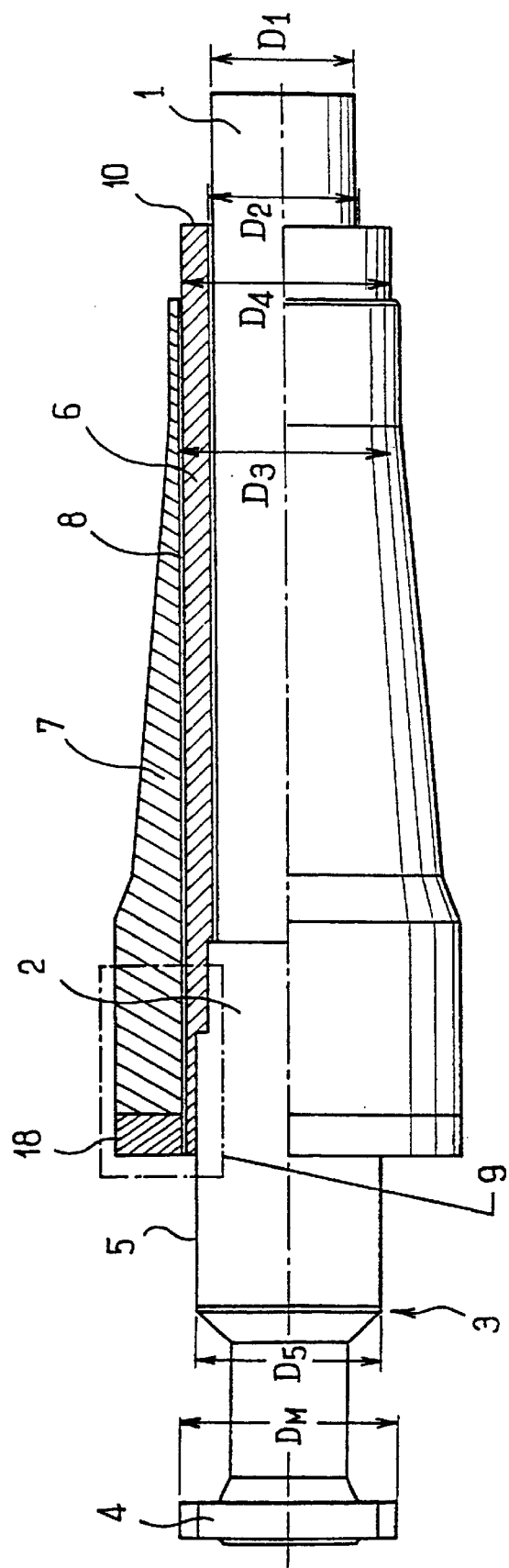
FIG. 1 is a view in longitudinal part-section of a flexible pipe fitted with the device according to the invention, the stiffener being fitted on an end fitting.
Figure 6:
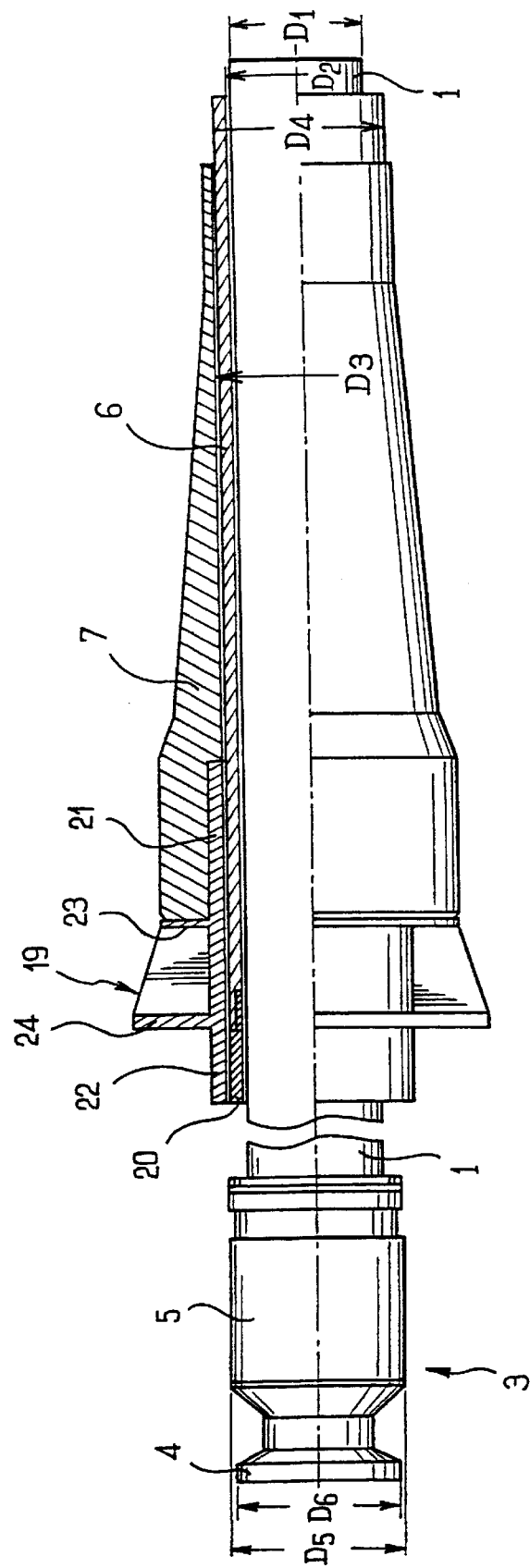
FIG. 6 is a part view in longitudinal section of a flexible pipe fitted with the device according to the invention, the stiffener being fitted some distance from an end fitting.

Depicted in FIG. 1 is a flexible pipe 1, one end 2 of which is connected to an end fitting 3. In the example depicted, the end fitting 3 comprises a connecting flange 4 which has outside dimensions that exceed those of the main body 5 and it is considered to be the part of maximum diameter $D_M$. As was recalled earlier, if the flange 4 was smaller, as is depicted in FIG. 6, then it would be the body 5 of the fitting 3 which would be considered as having the maximum diameter.

A support and bearing element 6 is arranged around the flexible pipe 1 which in its running length has a predetermined outside diameter, for example $D_1$. The support and bearing element has an inside diameter $D_2$ which is more or less equal to $D_1$, so that it can be pressed tightly around the flexible pipe 1 after it has been fitted in the desired position.

A stiffener 7, the structure of which is well known and described in the documents mentioned earlier, comprises a central through-passage 8, the diameter $D_3$ of which slightly exceeds the diameter $D_M$ so that it can slide over the connecting flange 4 and be brought into position after the fitting 3 has been fitted on the flexible pipe 1. In the absence of stresses, the diameter $D_3$ of the central passage 8 likewise slightly exceeds the outside diameter $D_4$ of the element 6 so that when the pipe curvature is low or zero, it is possible for the stiffener 7 to be slid in order to bring it into the desired position around the element 6. Advantageously, the diameters $D_1$, $D_2$, $D_3$ and $D_4$ are chosen to be such that the ratios $(D_2-D_1)/D_2$ and $(D_3-D_4)/D_4$ are less than or equal to $5/100$. Typically, the fitting 3 is connected fixedly to a support such as a platform, a ship or a subsea structure, and is connected to the end of a pipeline secured to this support. Under the combined effect of tension in the flexible pipe and the angular deflection of the latter relative to the axis of the fitting, the flexible pipe 1 and the stiffener 7 are curved, as is the element 6, adopting a curvature which is limited by the reaction that the stiffener offers, it being possible for the curvature to alternate cyclically in opposite directions in the case of dynamic applications. For this, the element 6 comprises at least one part which can be deformed in bending and which extends over a length of the flexible pipe ranging at least between the rear part and the front end of the stiffener 7. The stiffener 7 in such working situations is supported and bears continuously in its part on the inside of the curve on the element 6, so that the latter may be compressed by the stiffener 7. The element 6, the stiffener 7 and the fitting 3 are joined together by connecting means comprising the build-in members of the stiffener, various embodiments of which are described in the prior-art documents mentioned earlier, and the support for attaching the element 6. The connecting means are depicted in FIG. 1 diagrammatically and symbolically inside the block represented in dotted line and referenced 9, specific exemplary embodiments being illustrated in FIGS. 7 to 21 in particular.

The stiffener 7 which is adapted to the ambient conditions in which the flexible pipe 1 operates, has dimensions, and in particular a length, which are determined to suit the outside diameter $D_1$ of the flexible pipe 1 and the conditions of use, in particular the tension in the flexible pipe and the maximum value that the angle it makes in its approximately straight part beyond the stiffener with respect to the axis of the fitting 3 can reach. The front part of the element 6, on the opposite side from the fitting 3, extends continuously over the entire length of the stiffener 7, the front end of the element 6 preferably extending beyond the front end of the stiffener 7, forming the free end 10.

When the stiffener 7 is mounted on the end part of the flexible pipe 1 connected to a fitting, its rear build-in part is preferably arranged around at least the front part of the main body 5 of the fitting. FIG. 1 illustrates such a scenario when, incidentally, the maximum diameter $D_5$ of the main body 5 of the fitting 3 is smaller than the diameter of the flange 4 that forms the fitting connecting member. In this case, the rear part of the element 6, preferably in combination with a support for attaching the element of which it is the rearwards extension, has a cylindrical exterior surface with the same diameter $D_4$ as the front part of the element 6 and extending over the entire length of the stiffener 7 and of the build-in members 18 of the stiffener. In cases where the diameter $D_5$ of the main body 5 of the fitting is greater than or equal to the diameter of the fitting connecting member, the rear build-in part of the stiffener 7 advantageously bears directly on the cylindrical exterior surface of the main body 5 of the fitting. The element 6, preferably in combination with an attachment support, then has a cylindrical exterior surface, the diameter $D_4$ of which is approximately equal to the diameter $D_5$ of the main body of the fitting, so that the assembly formed by the main body of the fitting and the element 6 constitutes a cylindrical bearing surface to support the stiffener 7 along its entire length, with a possible discontinuity between the support for attaching the element 6 and the main body of the fitting 5 or the point of the attachment support.

The choice of materials for the stiffener 7 and the element 6 needs to take account of the specific properties of each.

According to a particularly simple and economic embodiment, excellent results can be obtained by manufacturing the element 6 from a homogeneous, compact and fillerless plastic. As the body of the stiffener 7 may, likewise, consist of a simple volume of plastic or alternatively may contain a somewhat rigid internal armature, the material of the supporting fitting may be identical to the plastic used for the stiffener, for example Adiprene L167 with a Shore A hardness of 95 and a Young's modulus of 70 MPa, or Adiprene L100 with a Shore A hardness of 90 and a Young's modulus of 50 MPa. For large stiffeners, the use of a hard material, with a Shore D hardness of 60 and a Young's modulus of 140 MPa may be envisaged, it being possible for the material used for the support and bearing element 6 to be Adiprene L167 or L100 with a lower hardness.

The materials Adiprene L167 and L100 are particular blends of polyurethane, ADIPRENE® being a trade mark belonging to UNIROYAL. Other plastics, in particular elastomeric plastics or thermoplastics can be used, for example polyethylene, polypropylene and PVC.

It is also possible to make the support and bearing element from a material which is appreciably more flexible and elastic than the material of the stiffener provided that the crushing of the material used does not exceed a few per cent, 5 to 10% maximum, at a pressure of 10 bar.

The through-passage 8 in the stiffener may be not entirely cylindrical for mould-relief convenience and is therefore slightly conical, the conicity being from 1 to 3 °. It is then used to center the support and bearing element with respect to the stiffener.

Depicted very diagrammatically in FIGS. 2 to 4 are cooling means formed on the support and bearing element 6. In general, these cooling means may consist of passages such as channels made in the wall of the element 6 or on its surface and allowing sea water to flow along the length of the element 6.

The first means 11 (FIG. 2) consist of grooves 12 formed on the interior face 13 of the support and bearing element 6, which faces the exterior face of the pipe 1, the cooling fluid flowing along the said grooves 12 and directly cooling the external skin of the flexible pipe as well as, at least partially, the inside of the stiffener 7 insofar as the thickness of the element 6 is not very great.

The second means are identical to those of FIG. 2, the difference being that the cooling grooves 12' are formed on the exterior face 14 of the support and bearing element 6, which faces the interior face of the stiffener 7 (FIG. 3). With grooves 12', the stiffener 7 is cooled directly, as is the flexible pipe 1 at least in part insofar as the thickness of the support and bearing element (6) is not very great.

It is also possible to combine grooves 12 illustrated in FIG. 2 and the grooves 12' illustrated in FIG. 3.

In the third embodiment of FIG. 4, the cooling means consist of elongate openings 15 formed in the support and bearing element 6 and passing right through the thickness of the wall of the element 6, the openings 15 communicating with one another via passages 16. The openings 15 allow effective cooling of the stiffener 7 and of the flexible pipe 1.

The grooves 12 or 12', or alternatively the openings 15 and the passages 16 may be oriented longitudinally, parallel to the axis of the flexible pipe. They may also have a helical overall shape.

The support and bearing element 6 may be made of a single piece, as depicted in FIG. 1, or in several sectors. Depicted in FIG. 5 is a support and bearing element 6 made, for example, in three separate blocks consisting of three identical sectors 17 which, once joined together around the flexible pipe 1, form a cylindrical annular structure. This allows fitting in situ on the site of installation and of use of the flexible pipe and the ability to replace the element 6 in situ in the event of wear or damage. In the case of large-diameter pipes, requiring a support element 6 of considerable diameter and length, this additionally makes it possible to reduce the manufacturing costs by reducing the cross-sectional dimensions of the part to be manufactured. What is more, the circumferential clearance that may be provided between the various blocks can be determined in such a way as to favor the fitting and correct operation of the device. Furthermore, the handling and transport of the flexible pipe are made easier because the pipe is bare, without pre-fitted element 6. Likewise, it is possible to produce the support and bearing elements 6 by joining together blocks manufactured with different dimensions. Of course, the support and bearing element 6 could be made in two semi-cylindrical parts, or in sectors of which there are more than 3.

Depicted in FIG. 6 is a stiffener 7 with the support element 6, which are arranged around the flexible pipe 1 some distance from the end fitting 3. The stiffener 7 is attached rigidly to a build-in support 19 or to build-in members secured to such a support, the build-in support being secured to a marine structure such as a fixed or floating platform, a ship, or a subsea structure such as a buoy or a fixed submerged structure. The build-in support 19 may be very close to the end fitting 3, but is normally remote from the fitting by a distance which may be several tens or several hundreds of meters. According to a particularly attractive embodiment, the fitting 3 is arranged so that it is accessible from a platform or a ship or in the top part of a caisson ("turret") around which a ship can turn freely while remaining anchored to the caisson, or remaining immobilized by dynamic positioning, the pipe 1 as it leaves the fitting 3 dropping through the marine structure in a vertical or oblique direction. The build-in support 19 is attached to the marine structure at the point where the flexible pipe 1 leaves the bottom part of the marine structure to pass through the sheet of water towards the bottom, typically showing a chain-like configuration.

With the aim of ensuring a practical and effective link between the bearing element 6, the stiffener 7 and the build-in support 19 of the stiffener, the device advantageously comprises a support 20 for attaching the bearing element 6 which is, on the one hand, arranged behind and secured to the support element 6 and, on the other hand, attached, as a preference, to the build-in support 19 or possibly to the flexible pipe 1.

When the operation of installing the assembly has been completed, the flexible pipe 1 may find itself secured to the support element 6 and to the attachment support 20. Alternatively, the device according to the invention advantageously allows the flexible pipe 1 to be left the possibility of sliding axially with respect to the stiffener 7 and to the build-in support 19. As a preference, sliding is made possible by a radial clearance between the flexible pipe 1 of outside diameter $D_1$, on the one hand, and, on the other hand, the assembly consisting of the attachment support 20 and the support element 6 of inside diameter $D_2$, the attachment support 20 then being secured to the build-in support 19 and independent of the flexible pipe. Alternatively, sliding can be obtained by a radial clearance between the attachment support 20 and the support element 6 of outside diameter $D_4$, on the one hand, and, on the other hand, the build-in support 19 and the stiffener 7 of inside diameter $D_3$, the attachment support 20 then being secured to the flexible pipe 1.

The build-in support 19 is a strong rigid piece, typically made of steel, comprising a cylindrical central part, the interior surface of which has a diameter that slightly exceeds the outside diameter $D_4$ of the bearing element 6 and constitutes an extension of the axial internal passage of the so-called active front part of the stiffener 7. The cylindrical part of the support 19 comprises a front portion 21, the exterior surface of which constitutes a bearing surface for the rear build-in part of the stiffener 7 and extends over enough length to be able to ensure the correct relative positioning and building-in of the flexible pipe 1 and of the stiffener 7 through the support element 6. As a preference, as is illustrated in FIG. 6, the cylindrical part of the build-in support 19 further comprises a rear portion 22, the interior surface of which constitutes a bearing surface for the support 20 for attaching the element 6. Attachment accessories such as radial pins provide the blocking, particularly in the axial direction, of the attachment support 20 for the element 6 with respect to the build-in support 19. The building-in of the stiffener on the support 19 is preferably consolidated by blocking and fixing, using known means, the rear of the stiffener 7 to the support 19 using known attachment means, like those illustrated diagrammatically in FIG. 6 in the form of a flange 23 integral with the support 19.

Furthermore, the build-in support 19 in its peripheral part, illustrated symbolically in FIG. 6 by the flange 24, comprises attachment regions or members (not illustrated) that allow it to be attached rigidly to the marine structure using known means of mechanical assembly such as screws, bolts, hinged collars, catches, etc.

The build-in support 19 may be made of several blocks that can be joined together around the flexible pipe 1 in the manner of a segmented collar. Alternatively, the support 19 may be made of one piece, the inside diameter of its cylindrical part slightly exceeding the maximum diameter $D_M$ of the end fitting around which the stiffener 7 has to pass. In the case of FIG. 6, this diameter $D_M$ is equal to the diameter $D_5$ of the main body of the fitting 3, the diameter $D_6$ of the flange 4 being smaller than the diameter $D_5$.

The operation of installing the flexible pipe 1 and the assembly comprising the stiffener 7 and the support element 6 and the attachment to the build-in support and the marine structure can be achieved, for example, as follows:

in a first step, with the flexible pipe 1 stored on a reel or in a basket on board the laying ship, its free end ending in the fitting 3 is paid out with the purpose of fitting the stiffener 7 before continuing the operation of laying the flexible pipe by laying it out in a subsequent step until the so-called first end is connected to the marine structure to be connected. In order to carry out this first step, the starting point is to set the support element 6 and/or its attachment support 20 around the free end of the flexible pipe, if these elements were not factory-fitted from the outset. It is then possible, as was described earlier, to pass the stiffener 7 around the fitting 3 and the end of the flexible pipe in such a way that it comes into place around the support element 6 and its attachment support 20, the inside diameter $D_3$ of the stiffener being slightly greater than the outside diameter $D_4$ of the support element and of the element 6. This initial fitting operation is completed by putting the build-in support 19 in place, the front portion 21 of its cylindrical central part being pushed into the front build-in part of the stiffener 7 and on the outside of the support element 6, and the rear portion 22 being arranged around the attachment support 20. As the diameter of the cylindrical internal part 21-22 is preferably greater than the maximum diameter $D_M$ of the fitting, the assembly comprising the stiffener 7 and the attachment support 19 can be fitted and securely assembled separately before passing it around the fitting 3. In an advantageous embodiment, the two assemblies, one comprising the stiffener 7 and its build-in support 19, and the other comprising the support element 6 and its attachment support 20 are then joined together and attached to one another by blocking the attachment support 20 on the cylindrical portion 22, the attachment support 20 and the support element having the possibility of sliding together along the flexible pipe 1.

In a known way, as described in Patent EP 565 445, the device thus produced by joining the two assemblies together is then temporarily immobilized at the intended point on the flexible pipe 1. The device may be immobilized by connecting it to a collar tightened around the flexible pipe 1 or to the fitting 3 by temporary securing means which can be broken or released in various ways, particularly by breaking under the effect of a higher tension exerted on the flexible pipe or by any mechanical means acting directly on the temporary securing means and operated by remote control or by a diver or from an ROV (Remote Operated Vehicle).

The next step consists in paying out the flexible pipe 1 from the laying ship using the so-called "pull-in" procedure, the fitting 3 typically being connected to an operating cable operated from a winch installed on the marine structure to which the fitting 3 is to be connected. The fitting 3 thus reaches an opening in the bottom part of the marine structure, which opening is advantageously equipped with guiding means such as a trumpetshaped member (bell mouth). It is then possible to continue to act on the cable in order to pull the pipe to make it penetrate inside the marine structure to a greater or lesser extent, until the build-in support reaches the opening in the bottom part of the marine structure. According to an advantageous embodiment, the overall widthwise dimensions of the build-in support 19 (such as the outside diameter of the flange 24 in the diagrammatic and symbolic depiction of FIG. 6) are greater than the radial dimensions of the passage orifice delimiting the opening in the bottom part of the marine structure. The attachment support 20 is thus immobilized on the annular wall delimiting the opening, respectively complementing bearing surfaces, typically radial or conical, then bearing against one another under the effect of the tension exerted on the operating cable. Locking means are then actuated in order to block the build-in support 19 directly in the opening of the marine structure. The temporary securing means are then broken or released, and this frees the flexible pipe 1 from the build-in device comprising the stiffener 7, the support element 6, the attachment support 20 and the build-in support 19, this build-in device now being secured to the marine structure.

The operation of installing the first end of the flexible pipe 1 by pulling ends in the connection of the connecting member 4 of the fitting 3 to the corresponding end of a pipeline secured to the marine structure.

The operation of laying the flexible pipe 1 can then continue by continuing to pay it out from the laying ship which moves away from the marine structure as the flexible pipe is laid on the seabed in a typical way.

FIGS. 7 to 21 illustrate various specific embodiments of a build-in device according to the invention.

Figure 7:
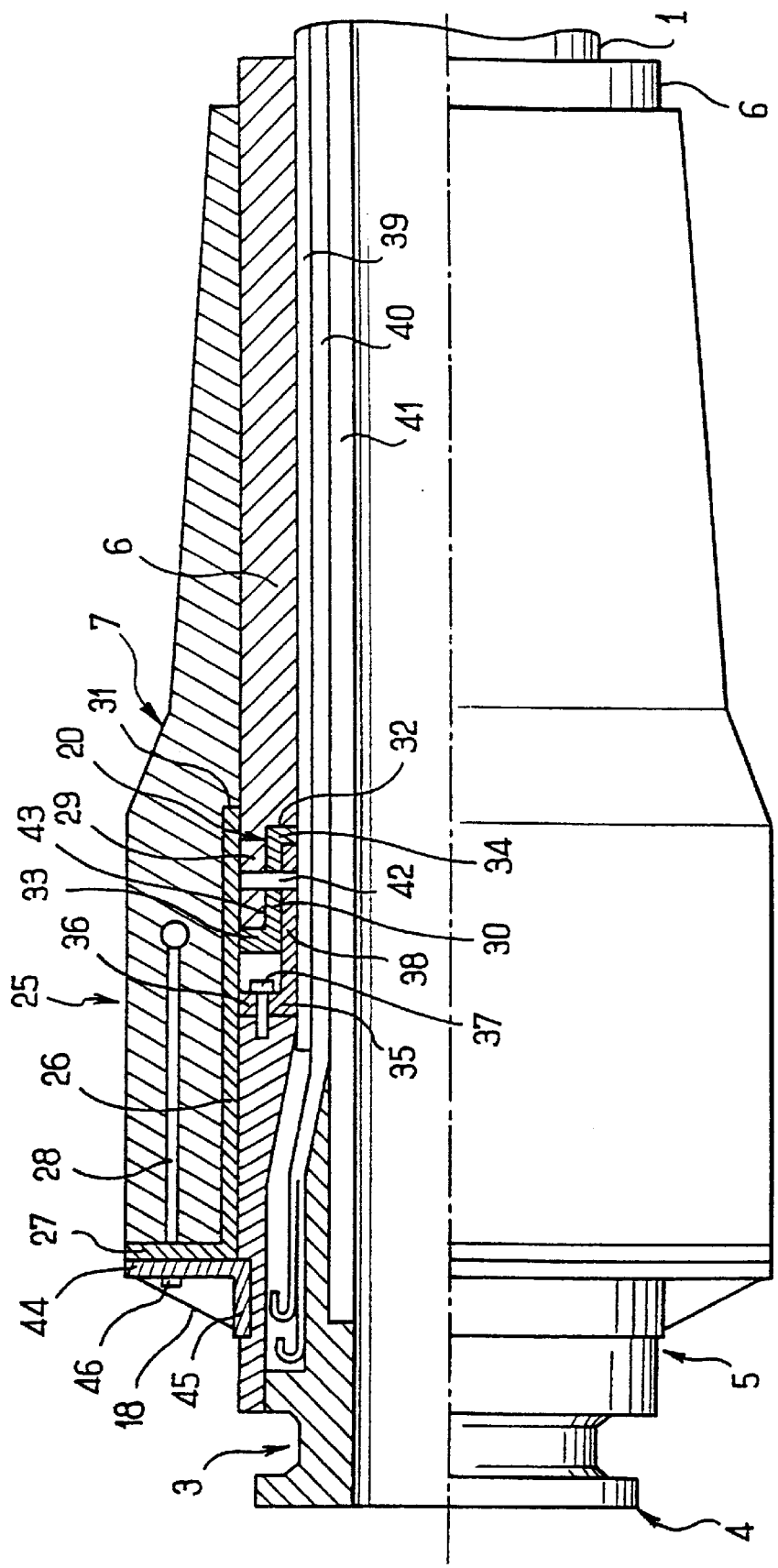

In the case of FIGS. 7, 8 and 9, the end fitting 3 constitutes the build-in support on which the stiffener 7 is mounted.

FIG. 7 illustrates a case in which the maximum diameter $D_M$ of the fitting 3 is equal to the diameter $D_5$ of the main body 5 of the fitting. In the build-in rear part 25 of the stiffener 7, the central passage 8 is delimited by a rigid cylindrical wall 26, preferably made of metal. The stiffener 7 further comprises, and this is also known, a rigid rear wall consisting of an annular radial metal plate 27 which is secured to the internal cylindrical wall 26, and an internal armature 28 embedded in the elastomeric material of the stiffener.

In the advantageous embodiment illustrated in FIG. 7, the support element 6 comprises a rear end part 29 which is also cylindrical but not as thick as the main part of the element 6. On the outside, the end part 29 bears on the stiffener in the region where the latter is made rigid by the metal cylindrical wall 26. On the inside, the end part 29 bears on a cylindrical middle part 30 of the attachment support 20, so that the end part 29 of the element 6 is held between the wall 26 of the stiffener 7 and the middle part 30 of the support 20. As the metal wall 26 thus bears on the main body 5 of the fitting and on the end part 29 of the support element 6, it is advantageously extended forwards so that its front end 31 is forward of the front end 32 of the attachment support 20. The means that block the rear end 29 of the element 6 are advantageously supplemented by two radial annular elements of the attachment support 20, these elements lying one on either side of its middle part 30, one of the radial elements 33 being at the back and facing outwards, and forming an axial stop for the end part 29 of the element 6, and the other radial element 34 being at the front and facing inwards, so that the attachment support 20 has an S- or Z-shaped cross-section.

The attachment support 20 is mounted on the fitting 3 via a connecting piece 35 which consists of a metal ring comprising, on the one hand, a radial bearing surface 36 bearing on a corresponding front bearing surface of the main body 5 of the fitting and attached thereto by means such as a number of screws or bolts 37 and, on the other hand, a cylindrical part 38. With a view to consolidating the axial centering of the stiffener 7 and of the support element 6 with respect to the flexible pipe 1, by means of the attachment support 20, the cylindrical part 38 bears radially, on the one hand, by its exterior surface on the cylindrical part 30 of the attachment support 20 and, on the other hand, via its interior surface, on the exterior surface of the flexible pipe 1, the wall of which is illustrated diagrammatically with an outer jacket 39, strengthening 40 and an interior part 41. The attachment support 20 is attached axially to the fitting 3 via a connecting piece 35 by means of attachment accessories such as radial pins 42. The axial attachment of the bearing and support element 6 may be achieved by the pins 42, but it may advantageously be consolidated by bonding the interface 43 where the rear part of the support element 6 bears on the cylindrical end part 30 of the support 20.

The stiffener 7 is, moreover, blocked on the fitting 3, in a known way, by a build-in member that consists of a metal flange 18 which has a part in the shape of an annular radial plate 44 bearing against the rigid rear wall 27 of the stiffener 7 and a cylindrical part 45 bearing against the main body of the fitting. In the example illustrated in FIG. 7, axial attachment is achieved by means such as nuts or bolts 46 blocking the free end of the armature 28 on the radial part 44 and by building the cylindrical part 45 into a groove 47 made in the exterior surface of the main body 5 of the fitting. The flange 18 is made in at least two parts, in the fashion of a segmented collar, so that it can be fitted around the fitting 3 after the stiffener 7 has been passed around the fitting and the support element 6. As the cylindrical part 45 of the flange 18 is thus housed in the groove 47, the flange is then assembled securely, by bolting for example. The operation is completed by moving the stiffener back until there is contact between the annular radial plates 27 and 44 and by attaching the stiffener to the axial attachment means 46.

In the examples illustrated in FIGS. 8 and 9, the stiffener is mounted on a fitting, the main body 5 of which has an outside diameter $D_5$ smaller than the diameter $D_6$ of the flange 4.

The device for mounting the stiffener and its support element illustrated in FIG. 8 comprises a connecting piece 35' comprising a front cylindrical part 38 bearing on the flexible pipe 1, just like in the case of the example illustrated in FIG. 7. The connecting piece 35' further comprises a rear part 48 with symmetry of revolution, the interior surface of which bears on the main body of the fitting 5 and the exterior surface of which has a diameter that corresponds to the outside diameter $D_4$ of the support element 6, slightly larger than the diameter $D_6$ of the flange 4, the stiffener 7 bearing, from the rear forwards, on the connecting piece 35' and on the support element 6. The connecting piece is made in at least two parts which can be joined together around the body 5 of the fitting, axial blocking being provided by a projection 49 of the rear part 48 penetrating a groove 50 of the main body 5 of the fitting. The connecting piece 35' thus axially blocks the attachment support 20 to which it is connected by pins 42. The stiffener 7 is attached to the fitting 3 via the connecting piece 35'. For this, the flange 18 made in at least two elements that can be joined together is, on the one hand, secured to the stiffener 7 by the means 46 and, on the other hand, immobilized on the connecting piece 35' by the penetration of a raised annular part 45 in a groove 51 at the surface of the piece 35'.

The device illustrated in FIG. 9 has no connecting piece like the pieces 35 or 35', the attachment support 20 being blocked on the fitting via a build-in member such as a flange 18' made in at least two parts that can be joined together around the fitting on which this flange is immobilized by the penetration of an internal cylindrical part 45' in a groove 47 at the surface of the main body 5 of the fitting. The attachment support 20 is attached to the flange 18' by means 52 such as screws, the stiffener 7 also being attached to the same flange 18' by means 46 already described.

As the attachment support 20 has a front radial element 34 bearing axially on the front peripheral bearing surface of the main body 5 of the fitting, it will be noted that unlike the examples of FIGS. 7 and 8, the end part 29 of the element 6 here bears radially on the body 5 via the cylindrical middle part 30 of the attachment support 20.

FIGS. 10 to 16 illustrate various examples of the mounting of the stiffener 7 on a marine structure, which examples are contrived to be such that the connection between the stiffener 7 and the flexible pipe 1 is achieved via a support element 6 according to the invention. The marine structure is depicted diagrammatically by the edges 53 of the opening in the marine structure, to which opening the stiffener has to be attached, and through which opening the flexible pipe 1 has to pass. The stiffener is attached to the edges 53 of the opening via a build-in support 19 which is produced in the form of a rigid piece 19 with symmetry of revolution comprising flanges 23 and 24 attached respectively to the stiffener 7 and to the edges 53 of the opening by means 46' and 54 such as screws or bolts.

FIGS. 10 to 13 illustrate devices in which the support element 6 is attached to the inside of the build-in support, in particular in the axial direction, the flexible pipe 1 being free to slide axially with respect to the support element 6.

Figure 10:
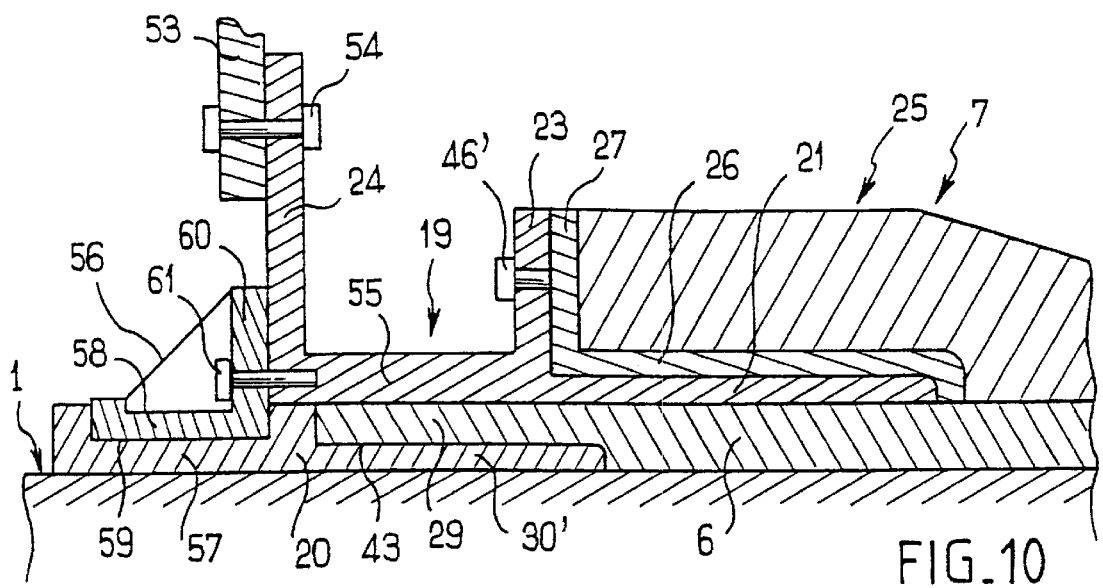
Figure 11:
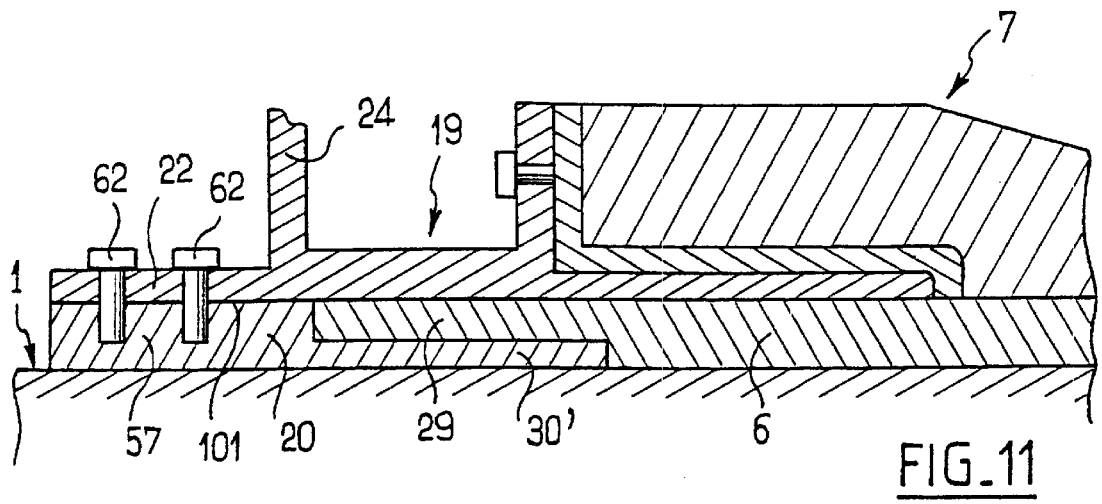
Figure 12:
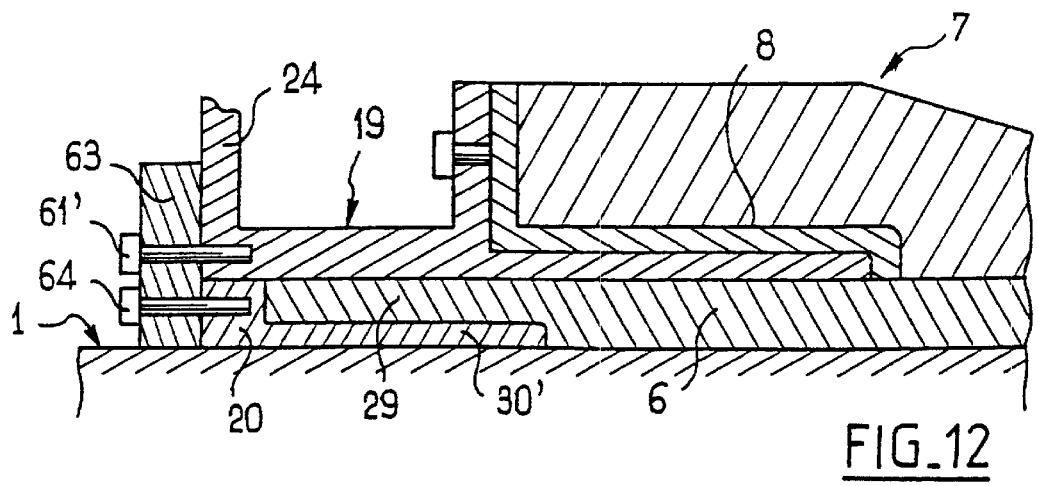

In the case of FIGS. 10, 11 and 12, the build-in support 19 comprises a cylindrical part, the interior surface of which is in extension of the internal surface of the passage 8 inside the stiffener and bears on the support element 6. The cylindrical part comprises a central portion 55 between the flanges 23 and 24 which bears on the rear end part 29 of the support element 6. In the rear build-in part 25 of the stiffener 7, the surface of the central passage 8 is delimited by a rigid cylindrical element 26 incorporated into the stiffener and the inside diameter of which exceeds the diameter $D_3$ of the stiffener so that the cylindrical part of the build-in support comprises a front portion 21 lying in the annular space between the support element 6 and the rigid element 26, this arrangement having the effect of reinforcing the building-in of the stiffener 7 onto the build-in support 19.

Furthermore, the support element 6 is attached to the build-in support 19 via the attachment support 20, the rear end part 29 of the support element bearing internally on a cylindrical part 30' constituting the front region of the attachment support 20. The support element 6 is retained axially with respect to the attachment support 20 by any known means, for example, in a simple and advantageous way, by bonding of the interface 43 between the rear part 29 of the element 6 and the front cylindrical part 30' of the attachment support 20.

As the centering of the flexible pipe 1 with respect to the stiffener 7 and with respect to the build-in support 19 is provided in the main by the support element 6, this centering effect is supplemented by the attachment support 20, the cylindrical interior surface of which is in extension of the interior surface of diameter $D_2$ of the support element 6.

The alternative forms illustrated in FIGS. 10, 11 and 12 differ mainly in the way in which the attachment support 20 is attached to the build-in support 19.

In FIG. 10, the attachment support 20 is attached to the build-in support 19 via a connecting piece 56 made in at least two sectors so that it can be joined together around a rear part 57, with symmetry of revolution, of the attachment support 20 and so that it can bear radially on this part. The piece 56 has a cross-section in the shape of an angle bracket, with a cylindrical part 58 built into a groove 59 at the surface of the rear part 57 of the support 20, and a radial part in the form of a flange 60 blocked against the build-in support 19 by assembly means 61 such as screws or bolts.

The build-in support 19 illustrated in FIG. 11 comprises a cylindrical part which has a rear portion 22 bearing on the rear part 57 of the attachment support 20 which can thus be attached to the build-in support 19 by assembly means 62 of any known type, for example screws or bolts.

In FIG. 12, the attachment support 20 is mounted via a radial annular connecting piece such as a flange 63, preferably made of at least two sectors that can be joined together, and which is attached both to the attachment support 20 and to the build-in support by assembly means 64 and 61' of any known type, such as screws or bolts.

Instead of being achieved by assembly with the build-in support 19 as in the case of FIGS. 10, 11 and 12, the mounting of the attachment support illustrated in FIG. 13 is achieved by joining it to the stiffener 7 using assembly means such as a flange 65. The flange 65 is blocked, by attachment means 66 and 67, both to the attachment support 20 and to the metal plates 26 and 27 that constitute the internal and rear edges of the build-in rear part 25 of the stiffener 7.

FIGS. 14, 15 and 16 illustrate embodiments comprising a support element 6 immobilized on the flexible pipe 1, it being possible for the assembly thus formed to slide axially, if necessary, inside the assembly consisting of the stiffener 7 and the build-in support 19.

In FIG. 14, the support element 6 is blocked axially on the flexible pipe via the attachment support 20, to which it is secured, for example, by bonding the interface 43 between it and the front cylindrical part 30' of the attachment support 20. The support 20 is immobilized on the flexible pipe thanks to a clamping collar 68 made of at least two parts which are joined together both around the flexible pipe 1 and around the attachment support 20, then tightened, by means such as bolts 69 in such a way as to block the collar 68 on the flexible pipe and anchor it to the support 20, it being possible for anchoring to be ensured by giving the ends which face each other belonging to the collar 68 and to the support 20 shapes that imbricate thus giving axial interlocking as illustrated in FIG. 14.

FIG. 15 illustrates a simplified embodiment, the support element 6 being immobilized directly on the flexible pipe by bonding the interface 70 between the rear part of its interior surface and the exterior surface of the pipe.

Figure 16A:
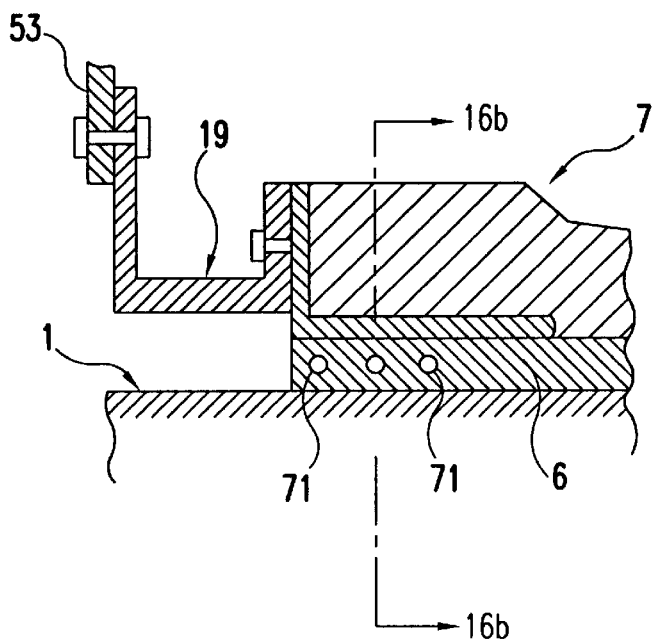
Figure 16B:
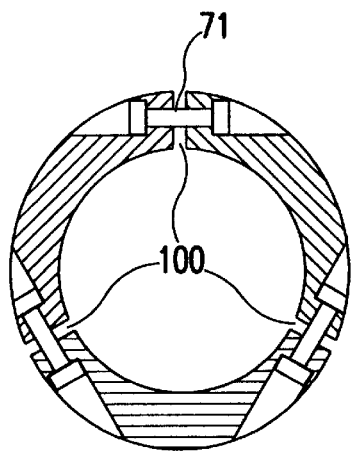

FIGS. 16a and 16b illustrates another embodiment similar to that of FIG. 15, the blocking of the rear part of the support element 6 being achieved by a purely mechanical effect of clamping around the flexible pipe 1. The support element is produced, at least in its rear part, in the form of several sectors separated by slits 100 and which can be clamped together so that they are pressed against the flexible pipe 1 in the manner of a segmented collar, it being possible for the clamping to be achieved by any known means, such as bolts 71.

Figure 17:
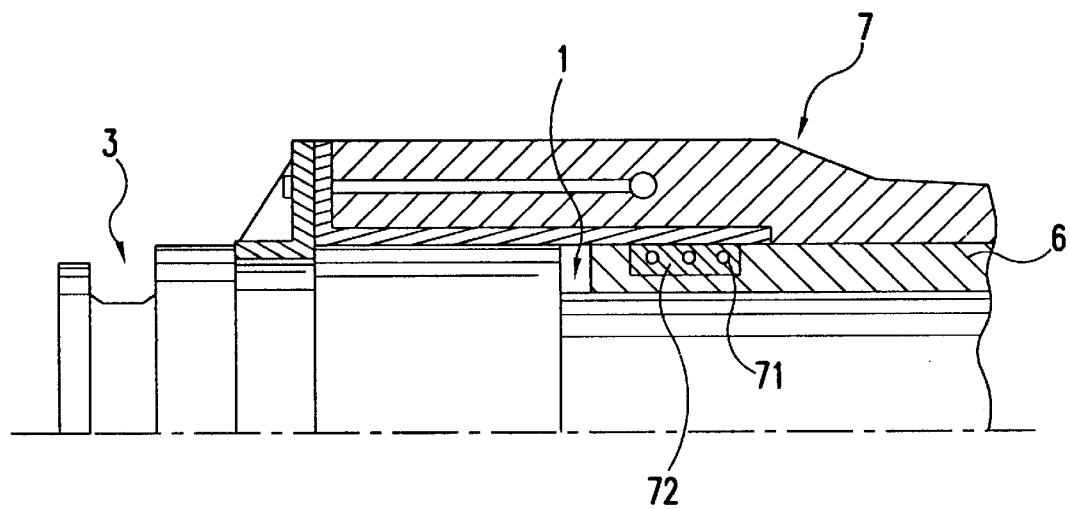

FIG. 17 illustrates another embodiment in which the support element 6 is also immobilized on the flexible pipe, the stiffener 7 being mounted on a fitting 3, like in the case of FIG. 7. The blocking of the support element is achieved by clamping onto the flexible pipe 1 a collar 72 which is placed in an open annular recess in the exterior surface of the element 6.

Figure 18A:
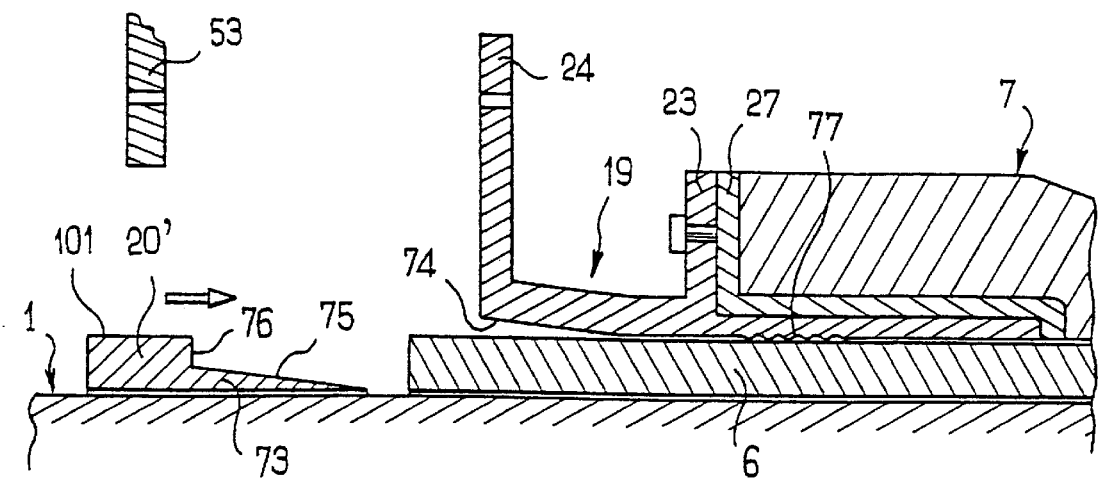
Figure 18B:
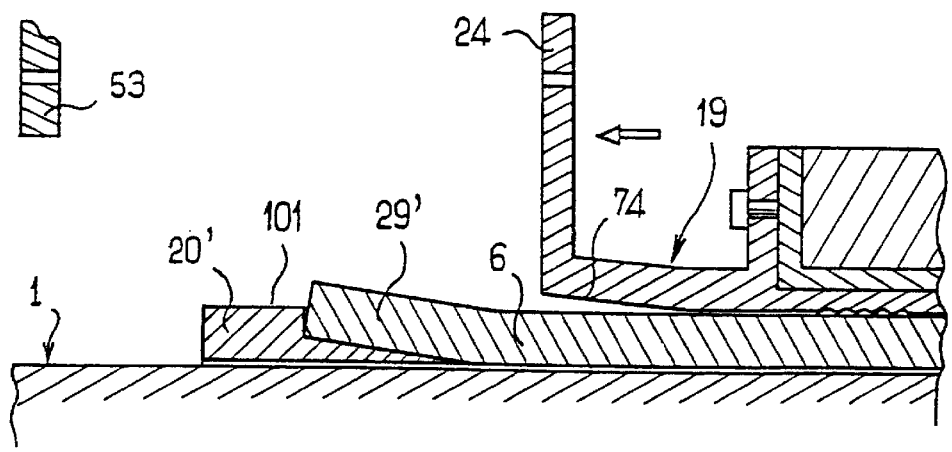
Figure 18C:
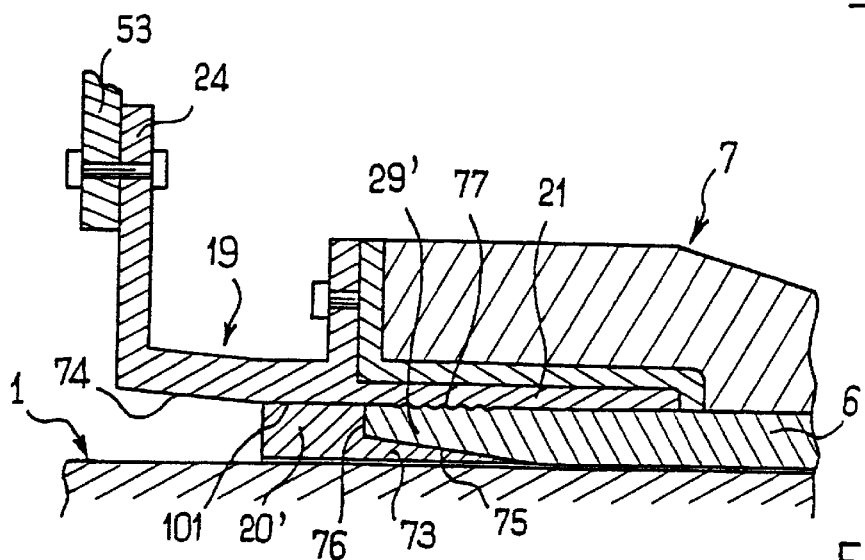

FIG. 18 illustrates another embodiment in which the support element 6 is attached to the build-in support 19 from the inside. The attachment support 20' comprises a front part 73 the exterior surface 75 of which is conical rather than cylindrical as was the case of the front part 30' in the examples of FIGS. 10, 11, 12, 13 and 14. The interior surface of the rear part of the build-in support 19 has a conical bearing surface 74. In a preliminary stage of the installation operation, illustrated by FIG. 18a, the assembly consisting of the stiffener 7 and the build-in support 19 is moved forward to uncover the rear part of the support element 6. The attachment support 20' is then pushed forward so that the bearing surface 75 which is forwards of the support 20' acts like an expander, gradually lifting the element 6, the rear part of which adopts a flared conical configuration illustrated in FIG. 18b, the progression of the support 10' forwards, that is towards the right in FIG. 18, being halted when a radial bearing surface 76 of the attachment support 20' comes into axial abutment against the rear end of the support element 6. In this situation, the rear part of the support element 6 extends outwards from the cylindrical surface of diameter $D_4$. By bringing the build-in support 19 secured to the stiffener 7 backwards, the cylindrical bearing surface 101 of the attachment support 20' is built into the build-in support 19, the conical bearing surface 74 of the attachment support 20' driving inwards that part of the support element which extends beyond the inside diameter of the build-in support 19, so that the rear end part 29' of the support element 6 finds itself tightly clamped and held between the build-in support 19 and the front part 73 of the attachment support 20' (FIG. 18c). The anchoring of the part 29' of the element 6 may be strengthened by making striations or corrugations over part 77 of the interior surface of the build-in support 19. Obviously, the rear part 29' of the bearing element 6 can also be pressed against the interior surface of the stiffener 7.

FIG. 19 illustrates another embodiment similar to that of FIG. 7, the connection between the attachment support 20 and the fitting 3 being achieved by a different method which is particularly well-suited to the case of pipes with a relatively small inside diameter, of the order of 50 mm to 120 mm. A connecting piece 35" is first of all attached to the fitting 3 by means 37. The surfaces which face each other belonging to the front part 30" of the connecting piece 35" and to the support 20 have, over part of their length, complementary screw threads 78, so that the support 20 can be blocked on the fitting 3 by means of the piece 35" by turning the assembly that consists of the support 20 and of the support element 6 about the axis of the flexible pipe until the screw 78 is completely tightened.

In another specific embodiment, the support element has enough resistance to flexural deformations that it can act as a stiffener to supplement the stiffener 7. In the example illustrated in FIG. 20, the stiffener 7 is mounted on a build-in support 19. The element 6' acting both as a support and bearing element for the main stiffener 7 and as a stiffener for the flexible pipe 1 is securely attached by means 79 to a member 80 acting both as an attachment support for the element 6' and as an additional build-in support, itself positioned accurately inside the build-in support by means such as machined cylindrical bearing surfaces 81. The effectiveness of the support element 6' in its function as an additional stiffener can be increased by an internal armature 82, for example like the one described in Patent WO 92/12376. With the same purpose of increasing the additional stiffening effect, the internal build-in support 80 advantageously comprises a cylindrical front part 83 on which the rear build-in part of the element 6' bears.

The armature 82 comprises elongate elements which are subjected to tensile or compressive loadings according to whether they are on the outside of the bend or on the inside of the bend depending on the direction in which the flexible pipe is curved. The rear ends of the elongate elements of the armature 82 pass through a front part 84 of the internal build-in support 80 and are blocked by attachment means such as welds 79 or bolts so that the longitudinal tensile and compressive loadings can be taken up by the internal support 80. These longitudinal loadings associated with the working of the element 6' as a stiffener are taken up by the attachment support 19 via an annular flange 85 attached to the internal support 80 and to the build-in support by attachment means 86 and 87 respectively, such as bolts.

In another embodiment not depicted, the build-in support consists of the fitting 3; in this case, the exterior surface of the internal build-in support 80 constitutes a cylindrical contact bearing surface bearing on a corresponding strengthened part of the stiffener, the internal build-in and attachment support 80 moreover being attached to the front end of the end fitting 3 by building in.

Figure 21:
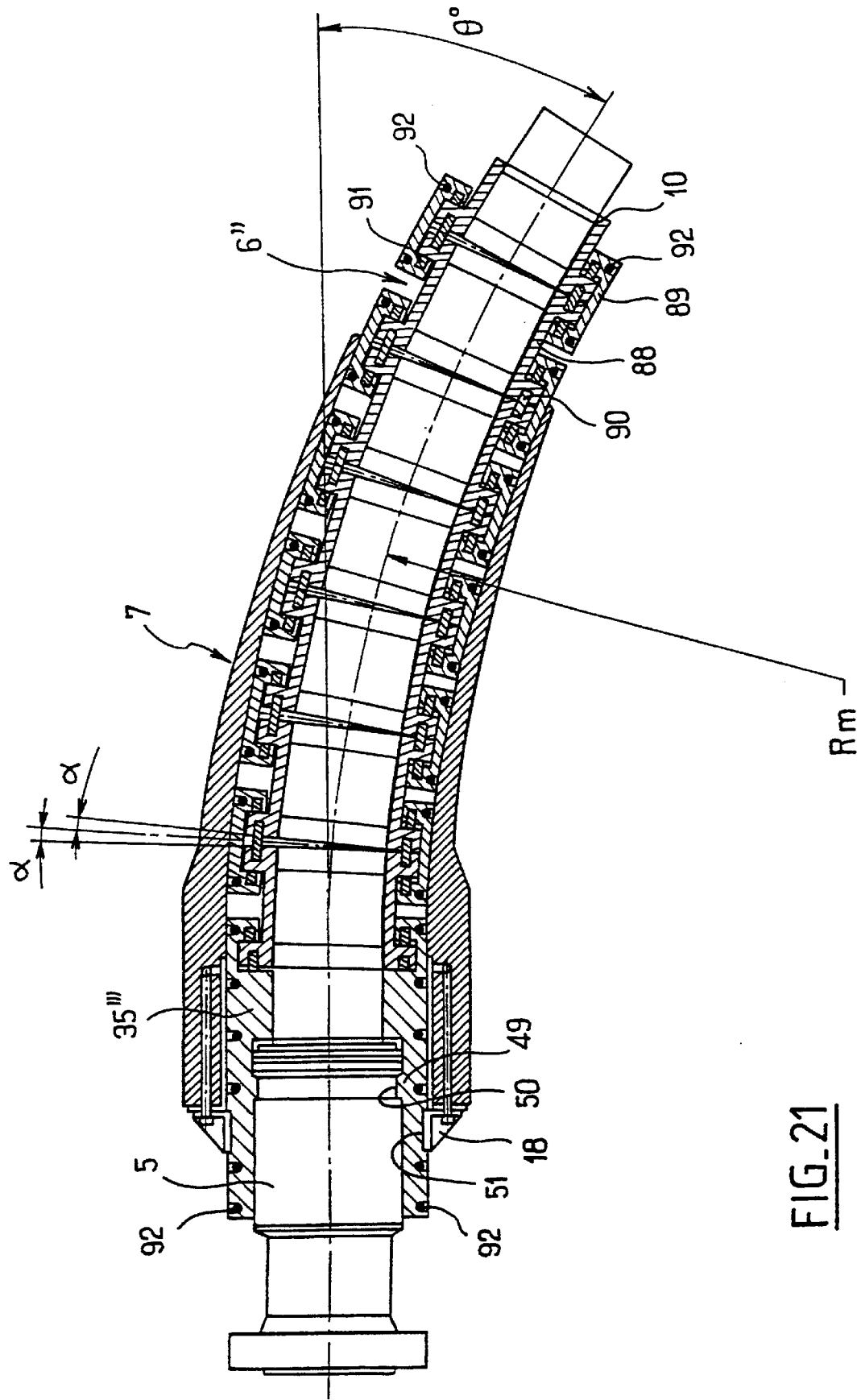

In the specific embodiment illustrated in FIG. 21, the support element 6" comprises blocking elements which limit the curvature of the flexible pipe to a maximum determined value. The assembly consisting of the combination of the stiffener 7 and of the support element 6" is therefore both a stiffener and a bend limiter ("bend stiffener" and "bend limiter" according to the definitions in API RP 17B).

The blocking elements comprise a set of imbrocated rings, with a U-shaped cross-section, the opening facing alternately outwards in the case of the inner rings 88, and inwards in the case of the outer rings 89. According to the principle known per se of bend limiters of the type said to have "vertebrae", the longitudinal distance between adjacent rings is limited between given maximum and minimum values. In the case of the advantageous embodiment of FIG. 21, the minimum bend radius is obtained when the lateral edges of the elements 88 on the inside of the bend touch, and on the outside of the bend, when a lateral part of one ring 88 touches a lateral part of a ring 89. The lateral parts of the rings 88 and 89 advantageously have an annular housing so that they can house annular elements made of elastomeric material 90 and 91, arranged respectively between the lateral edges which face each other belonging to the elements 88, and in each space between a lateral part of a ring 88 and a lateral part of a ring 89. The flexible pipe 1 is thus blocked at its minimum bend radius gradually and without jarring, by compression of the rings 90 on the inside of the bend and of the rings 91 on the outside of the bend, until the bearing surfaces that face each other of the rings 88 and 89 respectively come into contact. The combination of the ringed support element 6" with the stiffener 7 makes it possible to produce a device which is particularly attractive for controlling the curvature, because it combines the advantage of bend limiters, which is that of limiting the curvature to a fixed value while being of a relatively small bulk, including in the case of maximum curvatures of a high level, with the ability of stiffeners to work dynamically, whereas the vertebrae-type limiters of known type are restricted to static applications. FIG. 21 illustrates the device in its limiting configuration, the flexible pipe 1 in the region covered by the support and bend-limiting element 6" displaying a bend radius equal to its minimum value $R_m$. In the case of the example illustrated, as the inner rings 88 are similar to each other, as are the outer rings 89, the limiting value of the angle that can be made between the axes of two contiguous rings of the same type, for example two inner rings 88, has a given value illustrated by the angle $2\alpha$ in FIG. 21. Alternatively, this angle could vary along the length of the device if the various rings had different dimensions from the rear of the device forwards. The angular offsets between the successive rings add up so that the axis of the flexible pipe at the location of the front part of the element 6" is deviated through an angle $\theta$ with respect to the axis of the end fitting 3.

The rings 88 and 89 are made of a hardened mechanically strong material, particularly of metal, the choice of metal depending in particular on the specific corrosion conditions, or alternatively of plastic, particularly a fiber-reinforced plastic. The outer rings 89 are preferably made as a number of elements that can be joined together, for example as two halfrings. In the case of the example in FIG. 21, the stiffener 7 is mounted on an end fitting 3, the general arrangement being similar to that of the example of FIG. 8. The element 6", which combines the function as being a support for the stiffener 7 and that of limiting the curvature, is attached to the fitting 3 by a connecting member 35'", the front part of which has a profile that can be clipped together with a raised lateral part delimiting a dished part, the outline of which is similar to that of half a blocking ring, for example a ring 89 in the case illustrated here. Just like the outer rings 89, the connecting element 35'" consists of several sectors that can be joined together, for example two halves that can be joined together by bolts 92. The interior surface of the element 35'" has a raised part 49 engaged in an annular housing 50 at the surface of the main body 5 of the fitting. As the element 6" consists of a set of rigid rings, it has no build-in support like the support 19 used in the case of the various alternative forms of support element 6 made mainly of plastic, and is fastened to the connecting piece 35'" directly by the clipping-together of the rearmost ring of the element 6", for example an inner ring 88, and the front part of the element 35'", which therefore has the same clipping profile as the outer rings 89. The stiffener 7 is passed around the element 6" and the connecting member 35'" and attached to the fitting 3 by a flange 18, the internal edge of which is housed in an annular recess 51 at the surface of the connecting member 35'".

In an alternative form not illustrated, a support and bearing element for the stiffener 7 and for blocking the curvature similar to the element 6" of FIG. 21 can be used in cases where the stiffener is mounted on a build-in support 19 some distance from the end fittings. Such an element 6" can be attached to the build-in support 19 by means of a connecting member 35'" which is fastened to the element 6" by clipping in the same way as is illustrated in FIG. 21. As the connecting member 35'" is arranged, in the radial direction, between the flexible pipe 1 and the build-in support 19, it can be attached to the build-in support by means similar to those described above for assembling the rear part 57 of the attachment support 20 to the build-in support. Thus, for example, use can be made of a collar with a cross-section in the shape of an angle bracket similar to the connecting piece 56 illustrated in FIG. 10, or alternatively, the connecting member 35′″ can be attached to a cylindrical rear portion 22 of the build-in support 19 using bolts 62, as illustrated in FIG. 11.

Another advantage of the present invention lies in the fact that the stiffener can be mounted on the flexible pipe after the pressure tests have been carried out, and that this can be done after leaving the factory, at the instant when the flexible pipe is beginning to be placed in the storage means, such as the baskets, on the laying ship.

The present invention is also advantageous in the case of flexible pipes that have very large fittings. In particular, the embodiment depicted in FIG. 20 can be employed, and this makes it possible to produce bend limiters with extremely high levels of performance which can not be obtained with stiffeners manufactured using the existing industrial facilities. It is thus obvious that it would not be departing from the scope of the present invention if the stiffener were to be installed before the fitting is fitted.

What is claimed is:

1. A bend limiter for a flexible pipe, wherein the pipe has ends and has end fittings at the ends thereof, the bend limiter comprising:
   at least one stiffener around a length of the flexible pipe, the stiffener having a rear part for fixing to a build-in support and having an opposite front end; and
   a bearing element for the stiffener, the bearing element being disposed between the flexible pipe and the stiffener and being wrapped around the flexible pipe,
   wherein the stiffener includes at least one part which is deformable when the flexible pipe is bent, and which extends over a length of the flexible pipe lying at least between the rear part and the front end of the stiffener;
   and wherein the stiffener has an inside diameter, one of the end fittings of the pipe has an outside diameter, and the stiffener inside diameter is larger than the maximum outside diameter of the one end fitting so that the stiffener can be installed onto the flexible pipe by sliding the stiffener over the one end fitting,
   further wherein the end fitting on the pipe comprises a connecting member of the pipe, the connecting member has an outside diameter equal to the maximum diameter of the one end fitting, and the bearing element includes a rear part thereof around a main body of the end fitting.

2. The bend limiter of claim 1, wherein at least one of the end fittings of the pipe is fittable to the pipe so that the bearing element is around the flexible pipe before at least one end fitting is fitted to the pipe.

3. The bend limiter of claim 1, wherein the inside diameter of the deformable part of the bearing element is approximately equal to the outside diameter of the flexible pipe, and the deformable part of the bearing element has an outside diameter which is approximately equal to the inside diameter of the stiffener.

4. The bend limiter of claim 1, wherein the end fitting of the pipe comprises a main body having an outside diameter equal to the respective maximum diameter of the one end fitting, the bearing element being positioned on the flexible pipe forward of the front end of the main body of the end fitting.

5. The bend limiter of claim 1, wherein the build-in support comprises a build-in piece of the stiffener which is separate from the end fitting of the pipe and is arranged around the flexible pipe.

6. The bend limiter of claim 5, wherein the bearing element extends to and is fixed to the build-in support, the bearing element being shaped to have radial clearance with respect to the exterior surface of the flexible pipe for allowing relative longitudinal movement between the bearing element and the flexible pipe.

7. The bend limiter of claim 5, wherein the build-in support comprises a cylindrical rear part and the attachment support includes a rear part which bears against the cylindrical rear part of the build-in support.

8. The bend limiter of claim 1, wherein the bearing element is so constructed and is of such material as to be crushed by less than 10% at a pressure applied at the pipe and the bend limiter of 10 bar.

9. The bend limiter of claim 1, wherein the bearing element is comprised of a flexible plastic material.

10. The bend limiter of claim 9, wherein the bearing element has a Shore A hardness greater than 30.

11. The bend limiter of claim 1, wherein the bearing element is comprised of several arcuate sectors arranged around the flexible pipe for defining the bearing element.

12. The bend limiter of claim 1, wherein the bearing element comprises a sleeve, having slits extending into the sleeve at the same side as the rear part of the stiffener.

13. The bend limiter of claim 1, further comprising an attachment support for the bearing element, the attachment support being axially attached on the bearing element and also being attached to the build-in support at an axial end of the bearing element for blocking movement of the bearing element with respect to the build-in support.

14. The bend limiter of claim 13, wherein the attachment support includes a front part having an external surface which is conically shaped, narrowing inward axially toward the bearing element, and the bearing element has a rear part into which the conical exterior surface of the attachment support extends for pressing the bearing element against the interior of the build-in support at the stiffener.

15. The bend limiter of claim 13, wherein the attachment support includes a cylindrical bearing surface facing outwardly and the build-in support has an inward surface which bears on the cylindrical bearing surface of the attachment support for allowing the attachment support to be built directly onto the build-in support.

16. The bend limiter of claim 13, further comprising a connecting piece, having bearing surfaces which bear against the attachment support and against the build-in support for at least partially allowing the attachment support to be built onto the build-in support.

17. The bend limiter of claim 16, wherein the connecting piece is comprised of at least two arcuate sectors joined together.

18. The bend limiter of claim 13, further comprising a collar tightened around the flexible pipe and attached to the attachment support for retaining the bearing element axially on the flexible pipe.

19. The bend limiter of claim 13, wherein the attachment support has a cylindrical part and the bearing element has a cylindrical rear part which bears on the cylindrical part of the attachment support.

20. The bend limiter of claim 19, wherein the cylindrical rear part of the bearing element is arranged outside of the cylindrical part of the attachment support.

21. The bend limiter of claim 19, further comprising the rear part of the bearing element having one axially extending surface and the cylindrical part of the attachment support having another axially extending surface and the surfaces face each other and define an interface between them;

bonding at the interface between the surfaces for attaching the bearing element to the attachment support along the axial direction of the flexible pipe.

22. The bend limiter of claim 19, wherein the build-in support includes a cylindrical part, the attachment support includes a front part, and the rear part of the bearing element is disposed between the cylindrical part of the build-in support and the front part of the attachment support.

23. The bend limiter of claim 1, wherein the bearing element includes a rear part;
a clamp between the rear part of the bearing element and the flexible pipe for retaining the bearing element to the flexible pipe in the axial direction of the flexible pipe.

24. The bend limiter of claim 1, wherein the bearing element is also resistant to deformation in bending to cooperate with and provide an additional stiffening element so that the combination of the bearing element and the stiffener combine to reduce bending of the flexible part.

25. The bend limiter of claim 24, wherein the bearing element is comprised of a flexible plastic material having an elastic modulus in tension of at least fifty MPa.

26. The bend limiter of claim 25, wherein the bearing element contains reinforcing fibers embedded in the plastic material thereof.

27. The bend limiter of claim 1, wherein the bearing element comprises rings of rigid material around the flexible pipe.

28. The bend limiter of claim 27, wherein the bearing element comprises rings of metal and the rings are shaped and positioned for limiting the bending of the flexible pipe to a determined maximum value.

29. A bend limiter for a flexible pipe, wherein the pipe has ends and has end fittings at the ends thereof, the bend limiter comprising:
at least one stiffener around a length of the flexible pipe, the stiffener having a rear part for fixing to a build-in support and having an opposite front end, the build-in support comprises one of the end fittings of the flexible pipe; and
a bearing element for the stiffener, the bearing element being disposed between the flexible pipe and the stiffener and being wrapped around the flexible pipe,
wherein the stiffener includes at least one part which is deformable when the flexible pipe is bent, and which extends over a length of the flexible pipe lying at least between the rear part and the front end of the stiffener, the stiffener has an inside diameter, one of the end fittings of the pipe has an outside diameter, and the stiffener inside diameter is larger than the maximum outside diameter of the one end fitting so that the stiffener can be installed onto the flexible pipe by sliding the stiffener over the one end fitting,
further wherein the end fitting of the pipe comprises a connecting member, the connecting member having an outside diameter equal to the maximum diameter of the one end fitting; and
an annular member around the main body of the end fitting, the annular member being between the main body of the end fitting and the stiffener and being located at one axial end of the bearing element and the bearing element being secured to the annular member.

30. The bend limiter of claim 29, wherein the annular member has a front part with a surface and the attachment support also has a surface and the surfaces face toward each, complementary screw threads in the facing surfaces between the front part of the annular member and the attachment support.

31. A bend limiter for a flexible pipe, wherein the pipe has ends and has end fittings at the ends thereof, the bend limiter comprising:
at least one stiffener around a length of the flexible pipe, the stiffener having a rear part for fixing to a build-in support and having an opposite front end; and
a bearing element for the stiffener, the bearing element being disposed between the flexible pipe and the stiffener and being wrapped around the flexible pipe,
wherein the stiffener includes at least one part which is deformable when the flexible pipe is bent, and which extends over a length of the flexible pipe lying at least between the rear part and the front end of the stiffener, the stiffener has an inside diameter, one of the end fittings of the pipe has an outside diameter, and the stiffener inside diameter is larger than the maximum outside diameter of the one end fitting so that the stiffener can be installed onto the flexible pipe by sliding the stiffener over the one end fitting, and further comprising heat exchange means at the bend limiter.

32. The bend limiter of claim 31, wherein the heat exchange means comprises axial channels, extending along the bearing element through which water may flow.

33. The bend limiter of claim 32, wherein the bearing element has an interior surface toward the pipe and the channels of the heat exchange means are formed on the interior surface of the bearing element.

34. The bend limiter of claim 32, wherein the bearing element has an exterior surface and the channels comprise grooves formed on the exterior surface of the bearing element.

35. A bend limiter for a flexible pipe, wherein the pipe has ends and has end fittings at the ends thereof, the bend limiter comprising:
at least one stiffener around a length of the flexible pipe, the stiffener having a rear part for fixing to a build-in support and having an opposite front end; and
a bearing element for the stiffener, the bearing element being disposed between the flexible pipe and the stiffener and being wrapped around the flexible pipe,
wherein the stiffener includes at least one part which is deformable when the flexible pipe is bent, and which extends over a length of the flexible pipe lying at least between the rear part and the front end of the stiffener, the stiffener has an inside diameter, one of the end fittings of the pipe has an outside diameter, and the stiffener inside diameter is larger than the maximum outside diameter of the one end fitting so that the stiffener can be installed onto the flexible pipe by sliding the stiffener over the one end fitting,
further wherein the bearing element has a rear part along the flexible pipe, there is an interface between the rear part of the bearing element and the flexible pipe, and the interface is bonded over an area of the interface for retaining the bearing element in the axial direction along the flexible pipe.

36. A bend limiter for a flexible pipe, wherein the pipe has ends and has end fittings at the ends thereof, the bend limiter comprising:
at least one stiffener around a length of the flexible pipe, the stiffener having a rear part for fixing to a build-in support and having an opposite front end; and
a bearing element for the stiffener, the bearing element being disposed between the flexible pipe and the stiffener and being wrapped around the flexible pipe, the bearing element is also resistant to deformation in bending to cooperate with and provide an additional stiffening element so that the combination of the bearing element and the stiffener combine to reduce bending of the flexible part, wherein the stiffener includes at least one part which is deformable when the flexible pipe is bent, and which extends over a length of the flexible pipe lying at least between the rear part and the front end of the stiffener, the stiffener has an inside diameter, one of the end fittings of the pipe has an outside diameter, and the stiffener inside diameter is larger than the maximum outside diameter of the one end fitting so that the stiffener can be installed onto the flexible pipe by sliding the stiffener over the one end fitting, further wherein the bearing element includes therein an additional internal armature comprised of elongate elements extending continuously over a length in the bearing element, the bearing element having a rear end and the elongate elements having rear ends which extend beyond the rear end of the bearing element, and the rear ends of the elongate elements being anchored to the attachment support, the attachment support acts as an internal build-in support and is attached to the build-in support.

37. The bend limiter of claim of 36, wherein the internal build-in support includes an exterior surface which is a cylindrical contact bearing surface and bears upon the build-in support disposed around the exterior surface of the internal build-in support.

38. The bend limiter of claim 36, wherein the internal build-in support includes an exterior surface that is a cylindrical contact bearing surface, the stiffener having an interior surface over and bearing upon the exterior surface of the internal building support, the internal build-in support being attached to the end fitting.

39. A bend limiter for a flexible pipe, wherein the pipe has ends and has end fittings at the ends thereof, the bend limiter comprising:

at least one stiffener around a length of the flexible pipe, the stiffener having a rear part for fixing to a build-in support and having an opposite front end; and a bearing element for the stiffener, the bearing element being disposed between the flexible pipe and the stiffener and being wrapped around the flexible pipe, the bearing element comprises rings of metal and the rings are shaped and positioned for limiting the bending of the flexible pipe to a determined maximum value, wherein the stiffener includes at least one part which is deformable when the flexible pipe is bent, and which extends over a length of the flexible pipe lying at least between the rear part and the front end of the stiffener, the stiffener has an inside diameter, one of the end fittings of the pipe has an outside diameter, and the stiffener inside diameter is larger than the maximum outside diameter of the one end fitting so that the stiffener can be installed onto the flexible pipe by sliding the stiffener over the one end fitting, further wherein each metal ring includes two circular opposite edges comprising radial projections, the rings being oriented so that the radial projections of the rings fit between the radial projections of the axially adjacent rings, so that upon bending, the radial projections of the adjacent rings engage on the outer side of the bend curvature, whereby the assembly comprising the stiffener and the bearing element combine to control and limit the bending of the flexible pipe and function as a stiffener.

40. The bend limiter of claim 39, wherein the metal rings are generally U-shaped with the radial projections defining the legs of the U and the U shape of axially alternating rings respectively opening towards the inside and then towards the outside whereby the rings are imbricated.

41. The bend limiter of claim 40, further comprising annular elastomeric elements positioned between radial projections of adjacent rings for being compressed when the rings are moved with respect to each other so that the projections are moved towards each other, thereby to lock up a position corresponding to the maximum value of the bend being blocked.

* * * * *